United States Patent
Rasmussen et al.

(10) Patent No.: US 10,859,247 B2
(45) Date of Patent: Dec. 8, 2020

(54) METHOD OF DETERMINING THE POSE OF A MOVING HEAD LIGHT FIXTURE

(71) Applicant: Harman Professional Denmark ApS, Aarhus N (DK)

(72) Inventors: Niels Jorgen Rasmussen, Egaa (DK); Christian Quist Nielsen, Aalborg Øst (DK)

(73) Assignee: Harman Professional Denmark ApS

( * ) Notice: Subject to any disclaimer, the term of this patent is extended or adjusted under 35 U.S.C. 154(b) by 5 days.

(21) Appl. No.: 16/210,119

(22) Filed: Dec. 5, 2018

(65) Prior Publication Data
US 2019/0186720 A1    Jun. 20, 2019

(30) Foreign Application Priority Data
Dec. 15, 2017   (DK) .................................. 2017 00715

(51) Int. Cl.
| F21V 21/15 | (2006.01) |
| H05B 37/02 | (2006.01) |
| F21V 21/30 | (2006.01) |
| F21V 23/04 | (2006.01) |
| H05B 47/105 | (2020.01) |
| H05B 47/155 | (2020.01) |
| F21W 131/406 | (2006.01) |

(52) U.S. Cl.
CPC .............. *F21V 21/15* (2013.01); *F21V 21/30* (2013.01); *F21V 23/0492* (2013.01); *H05B 47/105* (2020.01); *H05B 47/155* (2020.01); *F21W 2131/406* (2013.01)

(58) Field of Classification Search
CPC ........... F21W 2131/406; F21V 23/0492; F21V 21/30
See application file for complete search history.

(56) References Cited

U.S. PATENT DOCUMENTS

2016/0102850 A1*  4/2016  Rasmussen ............. F21V 21/15
                                                         362/233
2018/0292809 A1* 10/2018  Farnik .................. G05B 19/416

FOREIGN PATENT DOCUMENTS

WO    2013139338    9/2013
WO    2016079308    5/2016

* cited by examiner

*Primary Examiner* — Joseph L Williams
*Assistant Examiner* — Jacob R Stern
(74) *Attorney, Agent, or Firm* — Angela M. Brunetti

(57) ABSTRACT

A method of determining pose of a moving head light fixture, comprising a support structure and a rotatable structure rotatable connected to the support structure. The rotatable structure comprises at least one light source generating a light beam and a position indicating the position of the position indicator. The method comprises the steps of arranging the position indicator at at least three different positions around the axis of rotation by rotating the rotatable structure; and a step of obtaining the position of the position indicator at each of the at least three different positions. The pose of the moving head light fixture can be obtained based on the obtained positions.

19 Claims, 13 Drawing Sheets

METHOD OF DETERMINING THE POSE OF A MOVING HEAD LIGHT FIXTURE

CROSS-REFERENCE TO RELATED APPLICATIONS

This application claims priority to DK Application No. PA201700715, filed Dec. 15, 2017, the disclosure of which is incorporated, in its entirety, by reference herein.

TECHNICAL FIELD

The inventive subject matter relates to a method and system for determining the pose of a moving head light fixture, where the pose indicate the position and orientation of the moving head light fixture in a 3D space.

BACKGROUND

It is known to plan and program light shows using various simulation and visualization software before setting up the actual light show. Such software tool can be used to plan the setup of light truss, light fixtures, video products etc. and to preprogram the light show in a 3D environment using information of the products' performance, position and orientation in the 3D environment. After the virtual planning and programming of the light show the light truss, light fixtures, video products etc. need to be setup in real life and it is difficult to arrange the various products at the exact same positions as planned in the software. As a consequence after the real life installation of light equipment a manual adjustment of the light programming is performed in order to account for a mismatch between the actual position of the products and the virtual position of the products. This is very time consuming especially in connection with touring where the stage nearly on daily basis is taking down and setup at different locations.

SUMMARY

A method and system as described by the independent claims. The dependent claims describe possible embodiments of the inventive subject matter. The advantages and benefits of the inventive subject matter are described in the detailed description of the invention.

DETAILED DESCRIPTION

The inventive subject matter is described in view of exemplary embodiments only intended to illustrate the principles of the inventive subject matter. The skilled person will be able to provide several embodiments within the scope of the claims.

Throughout the description, the reference numbers of similar elements providing similar effects have been given the same last two digits. Further similar elements providing similar effect within the same figure may be provide with additional characters such as letters or other signs.

Figure 1:
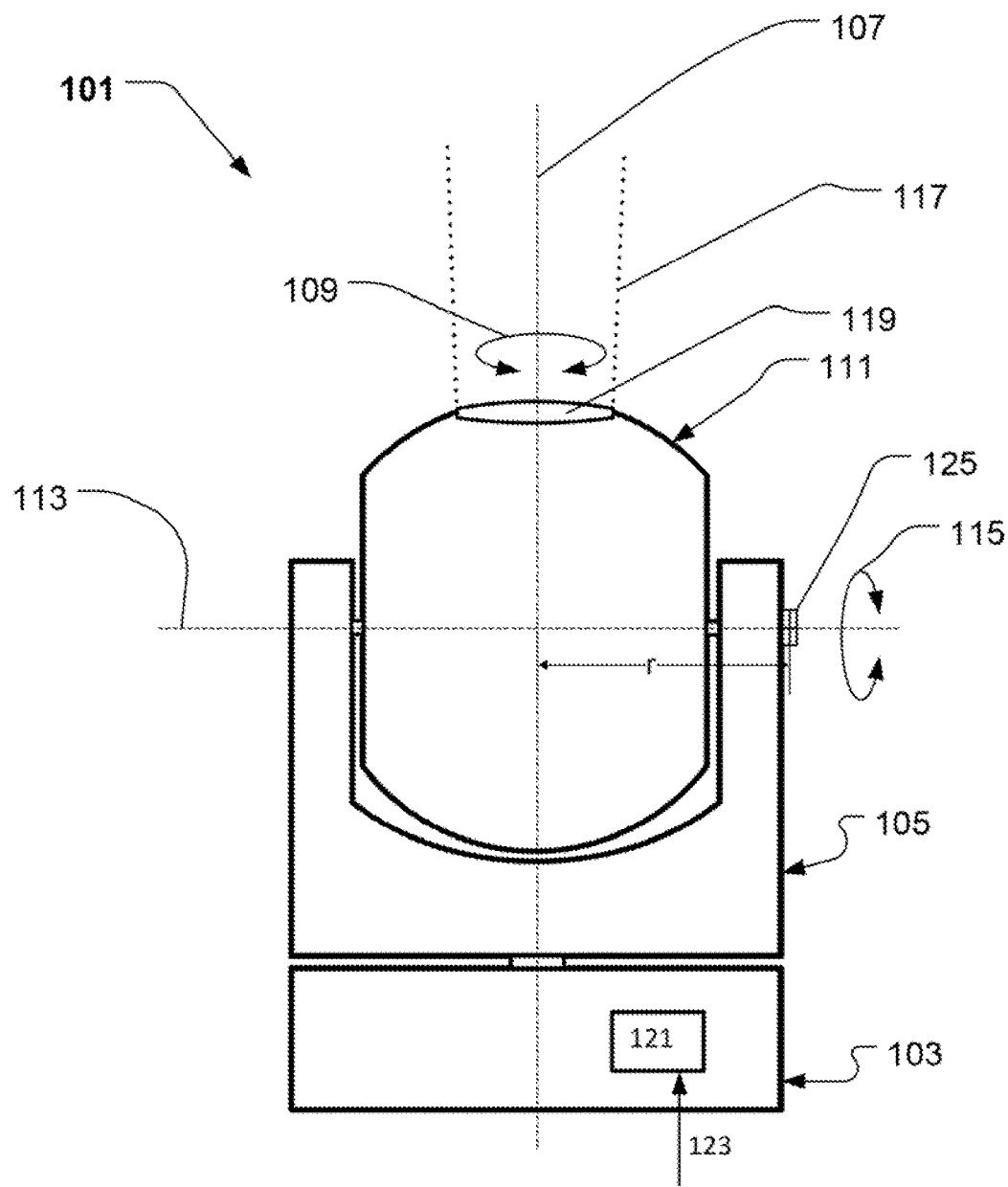
FIG. 1 illustrates a structural diagram of a moving head light fixture.
Figure 1:
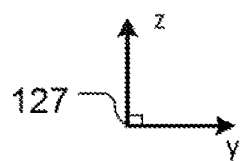

FIG. 1 illustrates a structural diagram of a light fixture 101 according to one aspect of the inventive subject matter. The light fixture comprises a support structure and a rotatable structure rotatable connected to the support structure. The rotatable structure is rotatable connected to the support structure and is rotatable around an axis of rotation.

In one or more embodiments the support structure is provided as a base 103 and the rotatable structure is provided as a yoke 105 where the yoke is rotatable in relation to the base around a yoke axis 107 as indicated by yoke rotation arrow 109. Additionally the yoke comprises a head 111 which is rotatable connected to the yoke and is rotatable in relation to the yoke around a head axis 113 as indicated by head rotation arrow 115.

The rotatable structure comprises at least one light source (not shown) generating a light beam 117 (illustrated in dotted lines). The light source is arranged inside the head and the light beam exists the head through an emitting window 119. The light source can be any kind of light source for instance, incandescent lamps, discharge lamps, plasma lamps, LEDs (light emitting diodes), OLEDs (organic LEDs), PLEDs (polymer LEDs) or combinations thereof. The emitting window is shown as an optical lens configured to deflect the light beam, however it is noticed that the light emitting window can be provided as any component allowing the light beam 117 to propagate through the head housing, such as optical lenses, clear areas, or as an opening in the housing. Additional it is noticed that the light source can also be arranged at the outer surface of the rotatable structure/head. At least one actuator (not shown) is adapted to rotate the rotatable structure around the axis of rotation. For instance a yoke actuator may be configured to rotate the yoke around the yoke axis and a head actuator may be configured to rotate the head around the head rotation axis, as known in the art of entertainment lighting.

The moving head light fixture comprises a controller 121 which controls the components (other subsystems) in the moving head light fixture based on a number of control parameters, such as light effect parameters, position parameters and other parameters related to the moving head lighting fixture. The light effect parameters relate to the light effects that the light beam should generate and may for instance relate to color, dimming level, prism effects, gobo effects, iris effects, animation effects etc. It is noticed that eventual components generating these light effects have not been shown. The position parameters can relate to the position of the head in relation to the yoke and/or position of the yoke in relation to the base. The control parameters can for instance be stored in a memory (not shown) of the light moving head light fixture or be received via an input signal 123. The input signal can be provided as separate signals (not shown) comprising different control parameters and may be provide as wired signals or wireless signals. The light fixture can comprise communication means enabling the moving head light fixture to communicate with other devices such as other light fixtures or light controllers. The moving head light fixture can comprise user input means (not shown) enabling a user to interact directly with the moving head instead of a light controller to communicate with the moving head. The user input means can for instance be buttons, joysticks, touch pads, keyboard, mouse etc. The user input means can also be supported by a display enabling the user to interact with the moving head light fixture through a menu system shown on the display using the user input means. The display device and user input means can in one or more embodiments also be integrated as a touch screen.

The moving head light fixture comprises a first position indicator 125 arranged at the rotatable structure and at a first position along and offset the axis of rotation. The first position indicator indicates the position of the first position indicator in relation to a reference point 127. The position indicator can be any device cable of indicating the position of the position indicator in relation to the reference point. The position indicator may for instance be based on a global navigation satellite system (GNSS) such as GPS, GLO-NASS, Galileo, BelDou etc.; a Wi-Fi positioning system (WPS), bluetooth based positioning systems; radio frequency based position systems, sound/ultrasound position systems, light based positioning systems, accelerometer based positioning systems, gyrometer based positioning systems or combinations thereof. The position indicator can for instance indicate the coordinates of it's position in relation to the reference point 127, for instance in a 3D coordinate system formed by x, y, z axis.

In FIG. 1 the first position indicator 125 is arranged at an outer surface of the yoke 105 at a position offset the yoke axis 107 and at the head axis 113. The position indicator is arranged offset the yoke axis at the distance of r.

The pose of the moving head light fixture in relation to the reference point can be obtained using the methods describe below. For instance by configuring the controller 121 to determine the pose of the moving head light fixture based on the methods described below. The moving head light fixture can also form part of a control/positioning system configured to determine the poste of the light fixture, where for instance a central controller is configured to control the moving head light fixture in order arrange the position indicator at different positions and obtain the position of position indicator at these positions.

Figure 2:
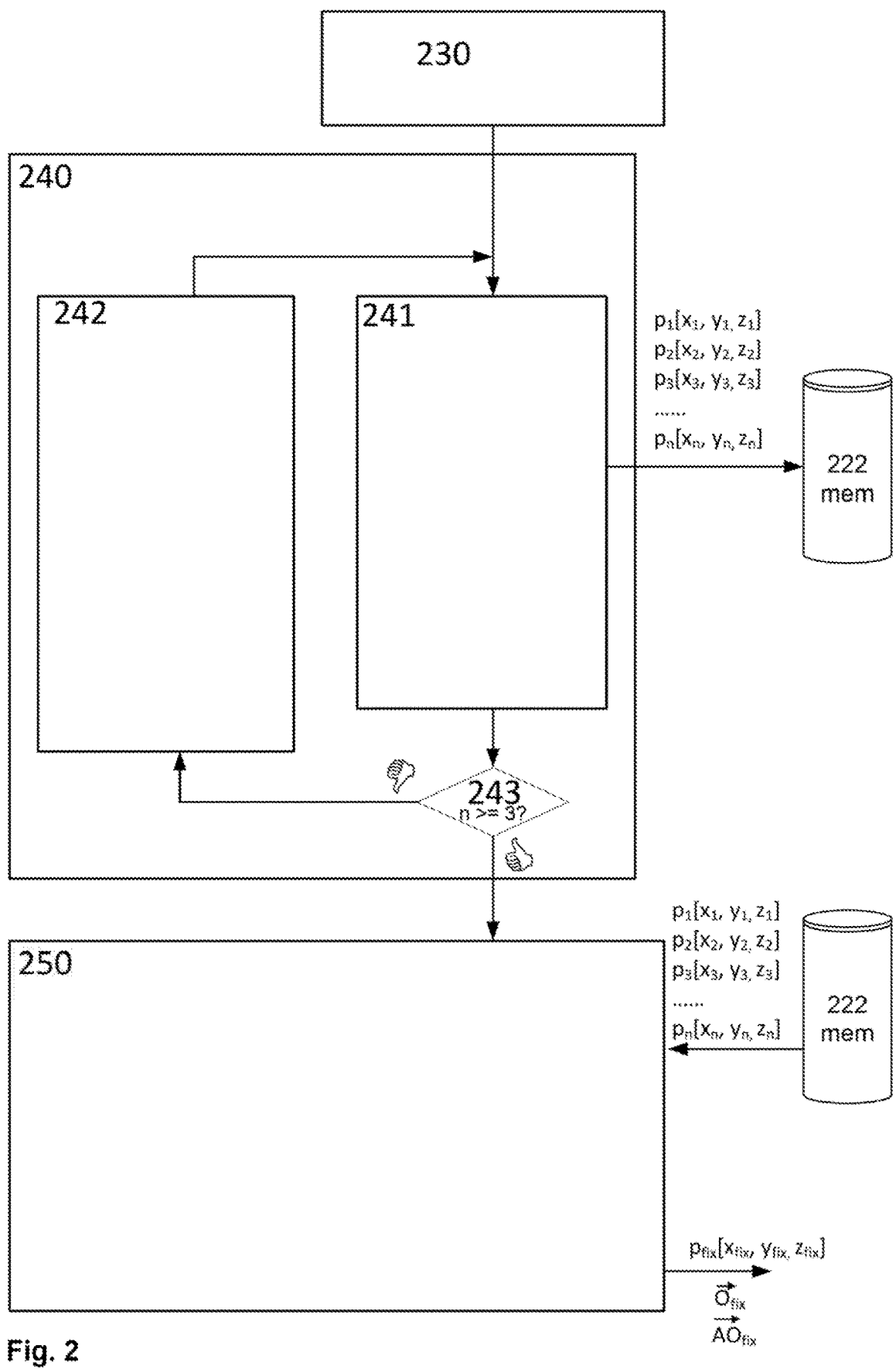
FIG. 2 illustrates a flow diagram of a method of determining the pose of a moving head light fixture.

FIG. 2 illustrate a flow diagram of one or more embodiments of the method of determining the pose of a moving head light fixture, where the moving head light fixture comprises a support structure and a rotatable structure rotatable connected to the support structure, such that the rotatable structure is rotatable around an axis of rotation. The rotatable structure comprises at least one light source generating a light beam.

The method comprises the steps of:

step 230 of providing a first position indicator at the rotatable structure and at a first position offset the axis of rotation;

step 240 of arranging the position indicator at at least three different positions around the optical axis and obtaining the position of the position indicator at each of the at least three different positions, where the position of the position indicator are obtained in step 241 by using the position indicator and where the position indicator is arranged at the at least three different positions in step 242 by rotating the rotatable structure around the axis of rotation;

step 250 of determining the pose of the moving head light fixture based on the obtained positions of the first position indicator.

The method is in the following described as a method for determine the pose of the moving head light fixture 101 illustrated in FIG. 1.

Step 230 of providing a first position indicator at the rotatable structure and at a first position along and offset the axis of rotation can be performed by arranging the position indicator at the rotatable structure at a position where it is arranged a distance from the axis of rotation. The position indicator can be arrange at any position at the rotatable structure which is offset the axis of rotation resulting in the fact that the position indicator will rotate around axis of rotation upon rotation of the rotatable structure. The position indicator can for instance be provide as a integral part of the rotatable structure, provide inside the rotatable structure, provided at the outer surface of the rotatable structure or at any other position of the rotatable structure. At the moving head light fixture 101 illustrated in FIG. 1 the position indicator 125 is provided at the rotatable structure by arranging the position indicator 125 at the yoke 105 at a position offset the yoke axis 107. In FIG. 1 the position indicator is arrange a distance r from the axis of rotation and will rotate around the yoke axis upon rotation of the yoke.

Step 240 of arranging the position indicator at at least three different positions around the axis of rotation and obtaining the position of the position indicator at each of the at least three different positions can be performed by repeating the step 241 and 242 until the position of the position indicator has been obtained at at least three different positions of the position indicator around the axis of rotation.

Step 241 of obtaining the position of the position indicator 125 can be performed by using the position indicator to indicate its' position in relation to the reference point 127 and storing the indicated position in a memory 222. The position of the position indicator can be stored as any data sat capable of indicating the position of the position indicator. For instance as x,y,z coordinates in relation to the reference point. After the position of the position indicator has been obtained and store in the memory a counter n is increased by 1. The counter n thus indicates the number of obtained positions.

In step 243 tested if the counter n is at least three. It is noted that the method can be setup to require obtaining the position of the position indicator at more than three positions. Thus n can be any number equal to or larger than 3. The number of obtained positions can for instance be increased in order to improve the accuracy of the determined pose of the moving head light fixture.

In case that the number of require obtained positions, n, has not been reached (illustrated by a thumb down) the rotatable structure will in step 242 be rotated in order to arrange the position indicator in a position different from the previously positions where the position has been obtained. Step 241 of obtaining and storing the position of the position indicator is thereafter repeated and the position of the new position is obtained and stored in the memory.

When the number of required obtained positions, n, has been reached (illustrated by a thumb up) a corresponding numbers of positions (larger than 3) have been obtained and stored in the memory 222. The obtained positions $p_1$, $p_2$, $p_3$ . . . $p_n$ may for instance be stored as a number of coordinates $p_1[x_1, y_1, z_1]$, $p_2[x_2, y_2, z_2]$, $p_3[x_3, y_3, z_3]$, . . . $p_n[x_n, y_n, z_n]$, where $x_n$ indicates the x coordinate, $y_n$ indicates the y coordinate and $z_n$ indicates the z coordinator of the position.

The pose of the moving head light fixture is then determined in step 250 based on the obtained positions of the position indicator. Various embodiments of step 250 will be described in further detail in the following part of the description. The output of step 250 is an indication of the pose of the moving head light fixture, where the pose indicates the position $p_{fix}$ of the moving head light fixture in relation to the reference point 127 and the orientation $\vec{O}_{fix}$ the moving head light fixture in relation to the reference point. The position $p_{fix}$ can be any point of the moving head light fixture for instance a point at the support structure, a point at the rotation structure or a virtual point defined in relation to the moving head light fixture. For instance the position of the moving head light fixture can be indicated as x, y z coordinates in relation to the reference point $p_{fix}$ [$x_{fix}$, $y_{fix}$, $z_{fix}$].

The orientation of the moving head light fixture can for instance be indicated by an orientation vector $\vec{O}_{fix}$ defining the direction of orientation of a part of the moving head light fixture for instance the orientation of the support structure and/or the rotatable structure. The orientation can also indicate the direction of the axis of rotation in relation to the reference point. One orientation vector $\vec{O}_{fix}$ may in some applications be enough to define the orientation of the moving head light fixture, however in many application it is also necessary to know the angular orientation of the moving head light fixture in relation to the orientation vector. For instance in connection with a moving head light fixture where the rotatable structure is provided as a yoke carrying a head as described in FIG. 1 it may be necessary to define the angular orientation of the moving head light fixtures in relation to the yoke axis. Consequently the step 250 may comprise a determination of an angular orientation vector $\vec{OA}_{fix}$.

This method makes it possible to obtain the pose of a moving head light fixture in a simple, efficient and reliable way. Once the pose of the moving head light fixture has been obtained it can be communicated to the lighting programming software controlling a light show and the light programming can be adjusted based on the pose of the moving head light fixture. Hereby the manual adjustment of the light programming that is often performed in order to account for a mismatch between the actual position of the products and the virtual position of the moving light head fixture in the 3D visualization software can be automatically performed based on the obtained pose of the moving head light fixture. For instance the pose of all moving head light fixtures in a large lighting setup can be determined based on the method and an adjustment of the light programming can then be performed very fast. Additionally in automatic tracking systems where the moving head light fixture are configured to automatically follow a performer determine automatically the pose of the moving head light fixtures makes it possible to calibrate and setup such automatically tracking systems much faster.

Figure 3:
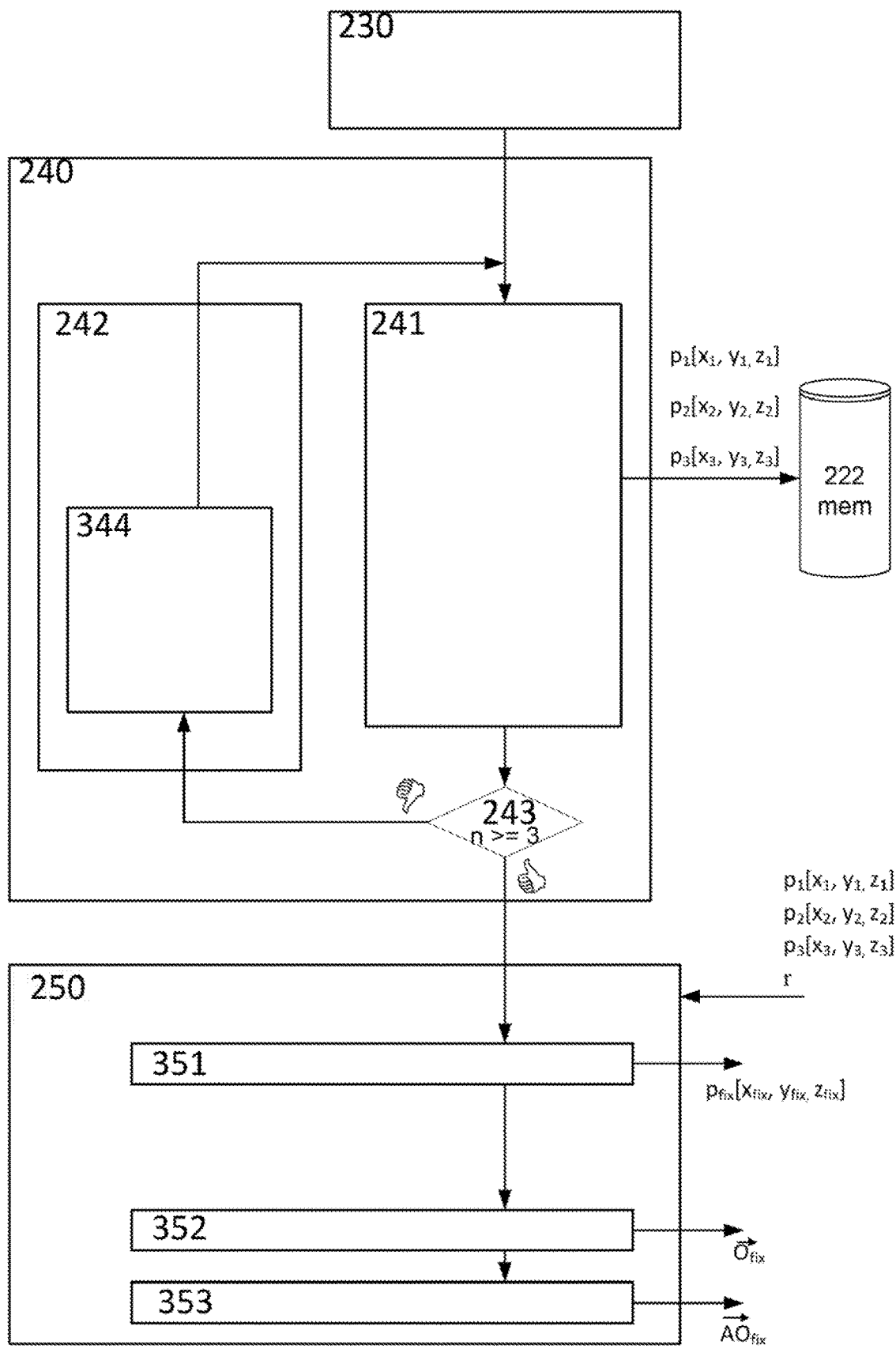
FIG. 3 illustrates a flow diagram of another method of determining the pose of a moving head light fixture.

FIG. 3 illustrates one or more embodiments of the method according to the inventive subject matter where step 242 of rotating the rotatable structure comprises a step 344 of rotating the rotatable structure in a predetermined direction of rotation. The result is that the obtained positions can be obtained as a number of constructive positions following a circular path around the axis of rotation. In this method step 250 of determining the posed of the moving head light fixture is in addition to the obtained positions of the position indicator also obtained based on the predetermined direction of rotation and the distance r from the axis of rotation to the positioning indicator. Step 250 comprises a step 351 of obtaining the position of the light fixture, a step 352 of obtaining the orientation of the light fixture and a step 353 of obtaining an angular orientation of the light fixture. The position of the light fixture indicates the position of the light fixture in relation to the reference point 127, the orientation of the light fixture indicates the orientation of the axis of rotation and the angular orientation of the light fixture indicates the angular orientation of the light fixture in relation to the axis of rotation.

The method of FIG. 3 describes one or more embodiments where the position of the position indicator is obtained at three positions, thus counter n equals 3. As a consequence three obtained positions $p_1$, $p_2$ and pa are obtained in step 240. The obtained positions $p_1$, $p_2$, $p_3$ and the distance from the optical axis to the position indicator r are thus inputs to the step 250 of obtaining the pose of the moving head light fixture. The principles of the step 250 of the method in FIG. 3 is described with reference to FIG. 4.

Figure 4:
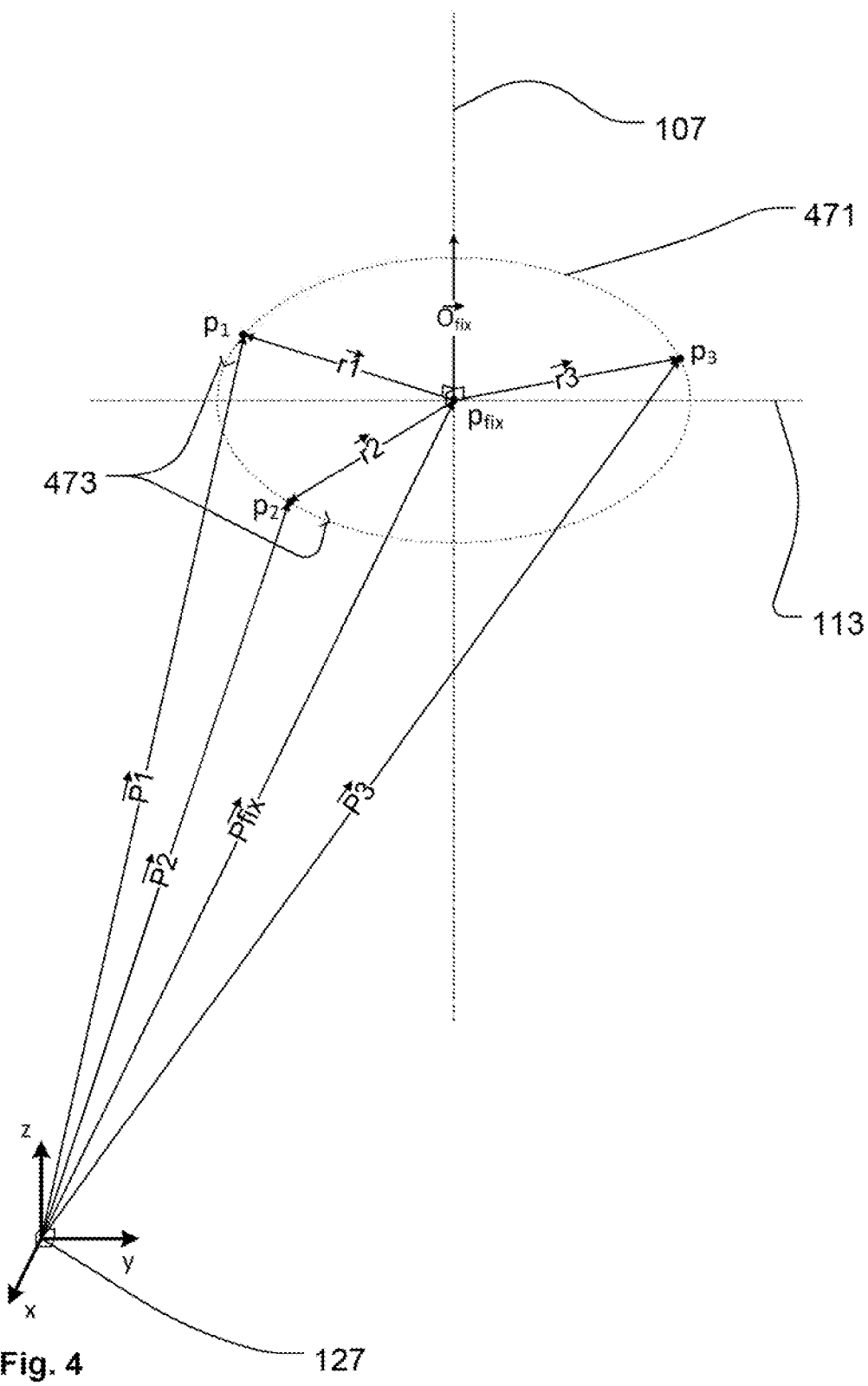
FIG. 4 illustrates a vector diagram illustrating the step of determining the pose based on the obtained positions according to the method of FIG. 3.

FIG. 4 illustrates a perspective vector diagram illustrating the position of the obtained positions $p_1$, $p_2$ and $p_3$ in relation to the reference point 127. The position of the yoke axis 107 and the head axis 113 are illustrated in the vector diagram and the dotted circle 471 illustrates the circular path of the position indicator when the yoke rotates in relation to the base. The direction of rotation is indicated by arrows 473. The position indicator has been arranged at the same height as the head axis 113 and the dotter circle will thus have center at both the head axis and yoke axis. In FIG. 4 the position of the moving head light fixture is considered to be arranged at the intersection between the yoke axis and the head axis and the center of the circle 471 is arranged at this intersection.

The positions can be defined by a number of position vectors starting from the reference point (origin):

$$\vec{P1} = \begin{pmatrix} x_1 \\ y_1 \\ z_1 \end{pmatrix} \qquad \text{Eq 1}$$

$$\vec{P2} = \begin{pmatrix} x_2 \\ y_2 \\ z_2 \end{pmatrix} \qquad \text{Eq 2}$$

$$\vec{P3} = \begin{pmatrix} x_3 \\ y_3 \\ z_3 \end{pmatrix} \qquad \text{Eq 3}$$

-continued $$\vec{Pfix} = \begin{pmatrix} x_{fix} \\ y_{fix} \\ z_{fix} \end{pmatrix} \qquad \text{Eq 4}$$

where vector $\vec{P1}$ defines the first obtained position, vector $\vec{P2}$ defines the second obtained position; vector $\vec{P3}$ defines the third obtained position and vector $\vec{Pfix}$ defines the position of the moving head light fixture.

Further a radius vector can be defined from the position of the moving head light fixture $p_{fix}$ to each of obtained positions $p_1$, $p_2$ and $p_3$ and these radius vectors can be found as:

$$\vec{r1} = \vec{P1} - \vec{Pfix} = \begin{pmatrix} x_1 \\ y_1 \\ z_1 \end{pmatrix} - \begin{pmatrix} x_{fix} \\ y_{fix} \\ z_{fix} \end{pmatrix} = \begin{pmatrix} x_1 - x_{fix} \\ y_1 - y_{fix} \\ z_1 - z_{fix} \end{pmatrix} \qquad \text{Eq 5}$$

$$\vec{r2} = \vec{P2} - \vec{Pfix} = \begin{pmatrix} x_2 \\ y_2 \\ z_2 \end{pmatrix} - \begin{pmatrix} x_{fix} \\ y_{fix} \\ z_{fix} \end{pmatrix} = \begin{pmatrix} x_2 - x_{fix} \\ y_2 - y_{fix} \\ z_2 - z_{fix} \end{pmatrix} \qquad \text{Eq 6}$$

$$\vec{r3} = \vec{P3} - \vec{Pfix} = \begin{pmatrix} x_3 \\ y_3 \\ z_3 \end{pmatrix} - \begin{pmatrix} x_{fix} \\ y_{fix} \\ z_{fix} \end{pmatrix} = \begin{pmatrix} x_3 - x_{fix} \\ y_3 - y_{fix} \\ z_3 - z_{fix} \end{pmatrix} \qquad \text{Eq 7}$$

The length of each of the radius vectors equals r and thus the following equations be set up:

$$r^2 = |\vec{r1}|^2 = (x_1 - x_{fix})^2 + (y_1 - y_{fix})^2 + (z_1 - z_{fix})^2 \qquad \text{Eq 8:}$$

$$r^2 = |\vec{r2}|^2 = (x_2 - x_{fix})^2 + (y_2 - y_{fix})^2 + (z_2 - z_{fix})^2 \qquad \text{Eq 9:}$$

$$r^2 = |\vec{r3}|^2 = (x_3 - x_{fix})^2 + (y_3 - y_{fix})^2 + (z_3 - z_{fix})^2 \qquad \text{Eq 10:}$$

The coordinates of $\vec{Pfix}$ can be found by solving these three equations with respect to $x_{fix}$, $y_{fix}$, and $z_{fix}$ As a consequence in step 351 the position $p_{fix}$ [$x_{fix}$, $y_{fix}$, $z_{fix}$] of the moving head light fixture can be found using Eq 1 Eq 8 to Eq 10.

In order to find the pose of the moving head light fixture the orientation of the moving head light fixture is obtained in step 352. The orientation can be found as an orientation vector $\vec{O}_{fix}$ defining the orientation of the moving head light fixture.

The orientation vector $\vec{O}_{fix}$ can be found as the cross product between the radius vectors $\vec{r1}$, $\vec{r2}$ and $\vec{r3}$. In this example the step 344 of rotating the rotatable structure in a predetermined direction is performed such that the rotatable structure is rotated less than 180 degrees between two of the obtained positions. The order in which the radius vectors need to cross to obtain the orientation vector is thus defined by the direction of rotation, the order of which the obtained positions $p_1$ $p_2$ and $p_3$ has been obtained and the fact the rotatable structure has been rotated less than 180 degrees between two constrictive obtained positions. The angle between two constructive radius vectors is thus less than 180 degrees and they are both arrange in the plane formed by the circle 471 and the cross product between two constructive radius vectors thus result in an orientation vector which is perpendicular to the plane of the circle. The direction of the orientation vector is defined by the order of which the cross product is found and using the right hand rule makes it possible to obtain the direction of the cross product in relation to the plane formed by the circle. In FIG. 4 the cross product between radius vectors $\vec{r1}$ and $\vec{r2}$ will have a direction which points upwards in relation to the plane of the circle and the same applies to the cross product between $\vec{r2}$ and $\vec{r3}$.

The orientation vector $\vec{O}_{fix}$ can thus be found as:

$$\vec{O}_{fix} = \vec{r1} \times \vec{r2} \qquad \text{Eq 11}$$

Alternatively an alternative the orientation vector $\vec{O}'_{fix}$ ca be found as:

$$\vec{O}'_{fix} = \vec{r2} \times \vec{r3} \qquad \text{Eq 12}$$

The orientation vectors $\vec{O}_{fix}$ and $\vec{O}'_{fix}$ are parallel and indicate the same direction of the moving head light fixture. The pose of the moving head light fixture can thus be obtained where the position of the moving head light fixture is indicated by position $p_{fix}$ [$x_{fix}$, $y_{fix}$, $z_{fix}$] and where the orientation of the moving head fixture is indicated as the orientation vector $\vec{O}'_{fix}$ and/or $\vec{O}'_{fix}$.

Figure 5:
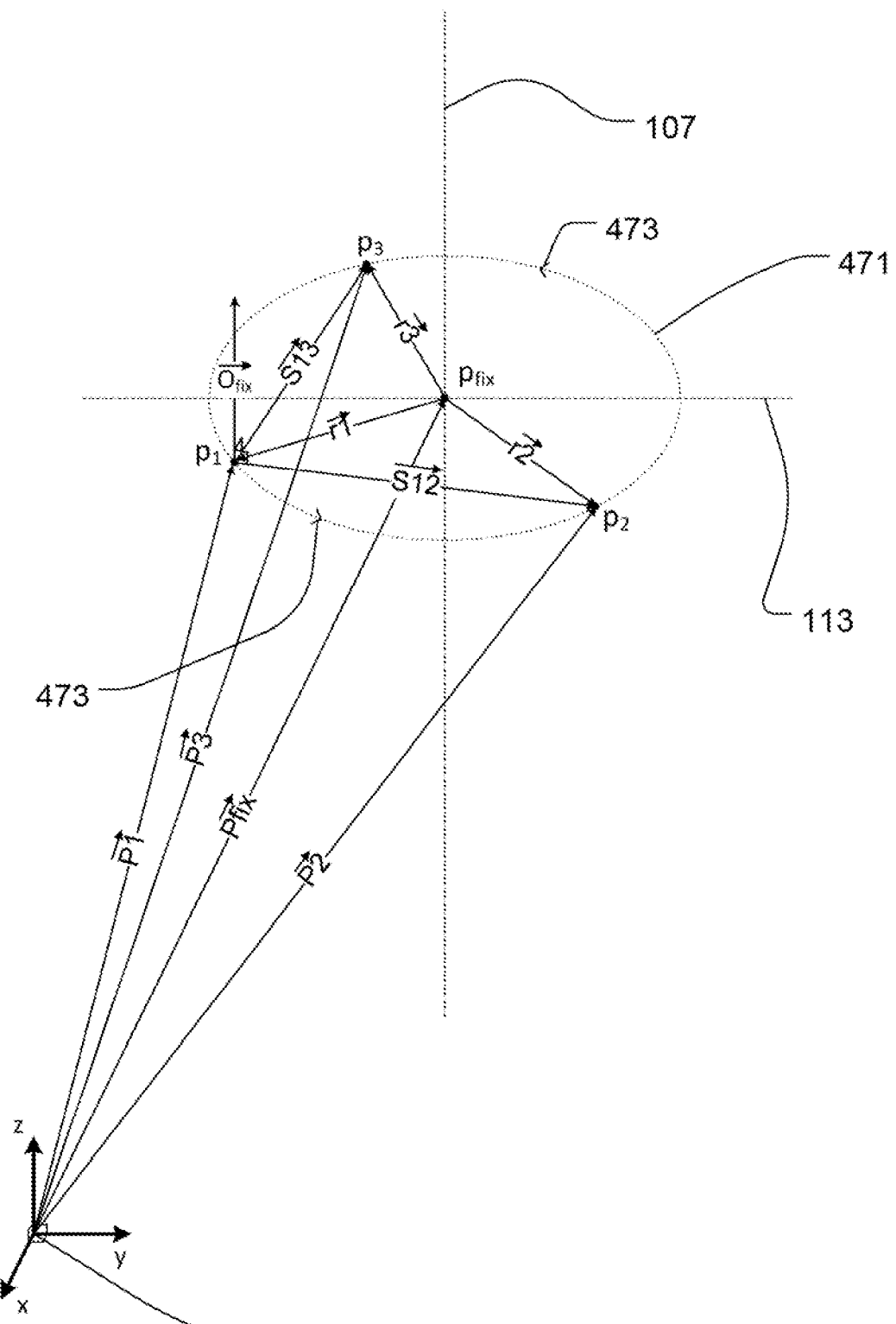
FIG. 5 illustrates a vector diagram illustrating another step of determining the pose based on the obtained positions according to the method of FIG. 3.

FIG. 5 illustrates a perspective vector diagram illustrating the position of the obtained positions $p_1$, $p_2$ and $p_3$ and serves to illustrate one or more embodiments of step 352. In FIG. 5 step 344 of rotating the rotatable structure in a predetermined direction of rotation is performed such that the total angle of rotation is less than 360 degrees when obtaining the obtained positions. It is thus ensured that all of the obtained points have been obtained within one rotation of the rotatable structure around the yoke axis. FIG. 5 illustrates a similar vector diagram as FIG. 4 and similar elements have been given the same reference numbers and will not be described further.

The coordinates of $\vec{Pfix}$ and thereby the position $p_{fix}$ [$x_{fix}$, $y_{fix}$, $z_{fix}$] of the moving head light fixture can be found using Eq 8, Eq 9 and Eq 10 as described previously in connection with FIG. 4.

A number of secant vectors can be defined between each of the obtained positions $p_1$, $p_2$ and $p_3$ and these secant vectors can be found as:

$$\vec{S12} = \vec{P2} - \vec{P1} = \begin{pmatrix} x_2 \\ y_2 \\ z_2 \end{pmatrix} - \begin{pmatrix} x_1 \\ y_1 \\ z_1 \end{pmatrix} = \begin{pmatrix} x_2 - x_1 \\ y_2 - y_1 \\ z_2 - z_1 \end{pmatrix} \qquad \text{Eq 13}$$

$$\vec{S13} = \vec{P3} - \vec{P1} = \begin{pmatrix} x_3 \\ y_3 \\ z_3 \end{pmatrix} - \begin{pmatrix} x_1 \\ y_1 \\ z_1 \end{pmatrix} = \begin{pmatrix} x_2 - x_1 \\ y_2 - y_1 \\ z_2 - z_1 \end{pmatrix} \qquad \text{Eq 14}$$

$$\vec{S23} = \vec{P3} - \vec{P2} = \begin{pmatrix} x_3 \\ y_3 \\ z_3 \end{pmatrix} - \begin{pmatrix} x_2 \\ y_2 \\ z_2 \end{pmatrix} = \begin{pmatrix} x_3 - x_2 \\ y_3 - y_2 \\ z_3 - z_2 \end{pmatrix} \qquad \text{Eq 15}$$

Secant vector $\vec{S23}$ is not illustrated in FIG. 5 for simplicity of the figure.

The angle between two of the secant vectors is less than 180 degrees, as the obtained points has been obtained during a rotation of the rotatable structure which in total is less than 360 degrees. The secant vectors are also arrange in same plane formed by the circle 471 and the cross product between two secant vectors thus result in an orientation vector $\vec{O}_{fix}$ which is perpendicular to the plane of the circle. The direction of the orientation vector is defined by the order of which the secant vectors are crossed and using the right hand rule makes it possible to obtain the direction of the cross product in relation to the plane formed by the circle.

In FIG. 5 the cross product between secant vectors $\vec{S12}$ and $\vec{S13}$ will have a direction which points upwards in relation to the plane of the circle.

The orientation vector $\vec{O}_{fix}$ can thus be found as:

$$\vec{O}_{fix} = \vec{S12} \times \vec{S13} \qquad \text{Eq 16:}$$

It is to be understood that the orientation vector $\vec{O}_{fix}$ can be found as the cross product of many different combinations of secant vectors and the direction of the orientation vector can be found using the right hand rule based on the order of which the secant vectors are crossed. For instance the secant vectors starting from one of the obtained points to the other obtained points can be defined and the cross product between any of these secant vectors will be perpendicular to the plane of the circle. The direction of the resulting orientation vector in relation to the plane can be found based on the direction of rotation.

For instance a first secant vector may be defined from a first obtained position to a second obtained position and a second secant vector may be defined from the first obtained position to a third obtained position, and when the first obtained position, the second obtained position are arrange in chronologic order along the circle and when the orientation vector can be obtained as the cross product between the first secant vector and the second vector the direction of the orientation vector in relation to the plane of the circle can be obtained using the right hand rule.

The orientation vector $\vec{O}_{fix}$ (eg. as obtained using methods of FIG. 4 or 5) indicates the orientation of the light moving head light fixture this may in some applications be enough to define the orientation of the moving head light fixture, however in many application it is also necessary to know the angular orientation of the moving head light fixture in relation to the orientation vector. For instance in connection with a moving head light fixture where the rotatable structure is provided as a yoke carrying a head as described in FIG. 1 it may be necessary to define the angular orientation the moving head light fixtures in relation to the yoke axis. Consequently the method may comprise a step 353 of obtaining the angular orientation of the light fixture.

The angular orientation of the moving head light fixture in relation to the axis of rotation can for instance by indicate as an angular orientation vector $\vec{OA}_{fix}$ and can be obtained by arranging the first position indicator at at least one predetermined position in relation to the axis of rotation. The predetermined position may for instance be a predetermined position of the rotatable structure in relation to the stationary structure. In a moving head light fixture this can be achieved by instructing the actuators rotating the rotatable structure around the axis of rotation to rotate the rotatable structure into a predetermined angular position. The method can thus comprise a step of arranging the first position indicator at at least one predetermined position in relation to the axis of rotation by rotating the rotatable structure to a predetermined angular position. This step can for instance be performed as a part of step 240 by arranging the position indicator at the predetermined position before obtaining the position of the position indicator.

In the method described in connection with FIGS. 3, 4 and 5 the first position $p_1$ may for instance be a predetermined position were the rotatable structure is arranged at a predetermined position in relation to the stationary structure. The radius vector $\vec{r1}$ (found by Eq 5) can be used as an angular orientation vector defining the angular orientation of the support structure around the axis of rotation. Thus:

$$\vec{OA}_{fix} = \vec{r1} \qquad \text{Eq 17}$$

It is noticed that some or all of the positions where the positions indicator is arranged can be can predetermined positions, as a consequence the radius vector defined by each of these positions can be used as an angular position vector defining the angular orientation the light fixture in relation to the axis of rotation.

Figure 6:
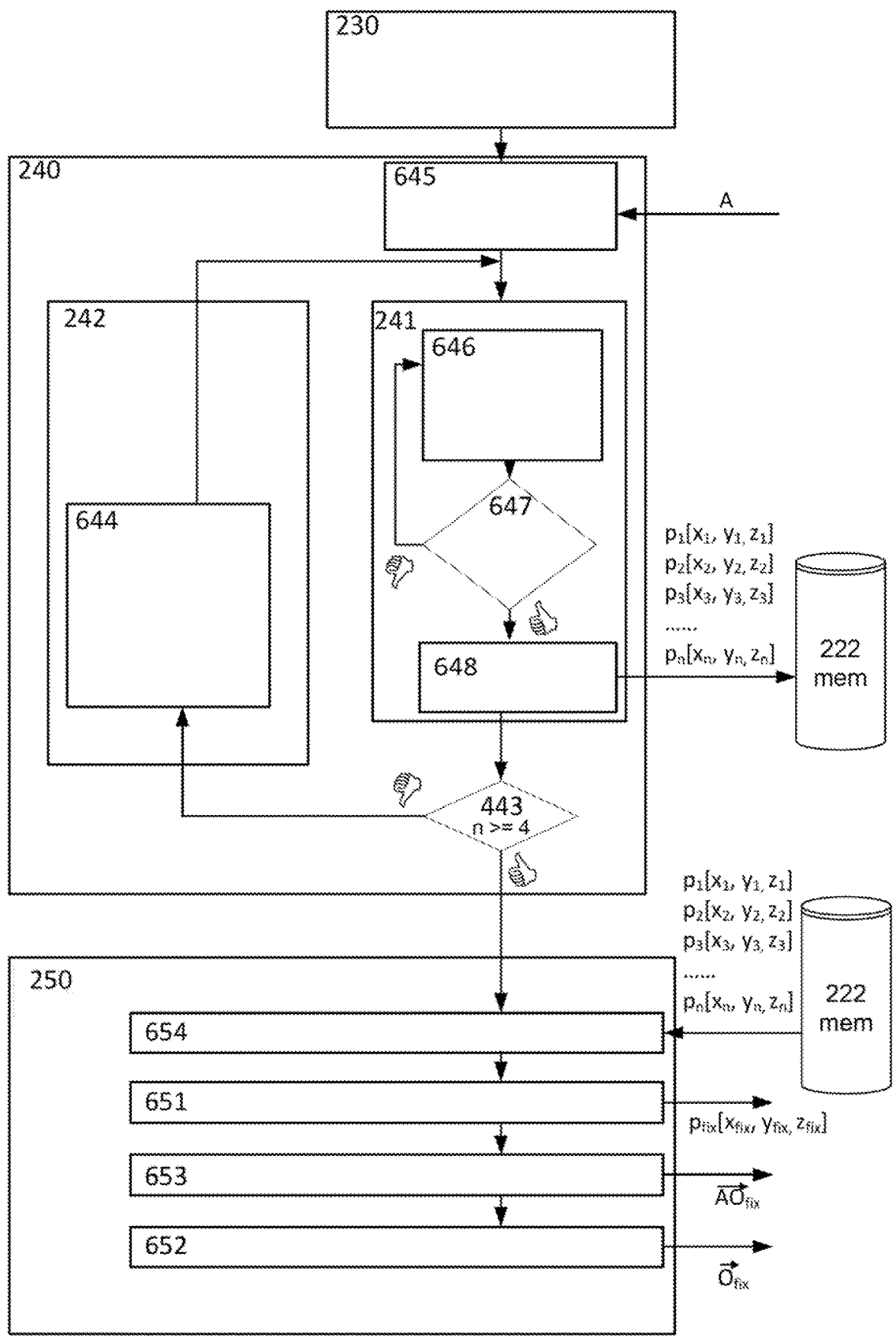
FIG. 6 illustrates a flow diagram of another method of determining the pose of a moving head light fixture.

FIG. 6 illustrate a flow diagram of the method according to the inventive subject matter. The method comprises the same steps as described in connection with the method illustrated FIG. 2 and the steps have the same reference numbers as in FIG. 2 and will not be described further.

In FIG. 6 step 240 is initiated with step 645 of arranging the rotatable structure at a predetermined angular position in relation to the support structure. The predetermined angular position can for instance be indicated by an angle A defining the angle of rotation of the rotatable structure in relation to the support structure, when the rotatable structure have been arranged at the predetermined angular position step 241 of obtaining the position the position indicator 125 is performed.

In FIG. 6 step 241 comprises a step 646 of obtaining a plurality of positions at the same position of the position indicator. This can be done by performing a plurality of position measurements using the position indicator and store the obtained position measurements in a memory. Thereafter the quality of the measured positions can be verified 647 in order to ensure the in step 241 obtained positions lies within a predetermined tolerance. The verification can for instance be performed by determining the spread of the measured positions and discarding the measurements if the spread of the measured positions exceeds a predetermined tolerance. Alternatively single measurements can be discarded if they fall outside a predetermined distance to the average position obtained as an average of the measured points. In case the measured points cannot be verified the step 646 can be repeated until the measured positions fulfill the required tolerances. This ensures that the obtained points which in step 250 are used to determine the pose of the light fixture fall within predetermined tolerances and that the pose of the moving head can be determined with the desired accuracy. Alternatively step 242 of rotating the rotatable structure can be performed before repeating step 646, whereby the position indicator is moved to another position. This makes it possible to obtain the pose of the light fixture despite the position indicator at some positions not being able to provide an accurate indication of its position for instance due to weak signals, signal noise, loss of eye of sight which depends on the position technology that the position indicator is using.

The obtained position of the position indicator at the predetermined position is determined in step 648 based on the plurality of measured positions, for instance by determining the obtained position as the average position of all the measured positions. This improves the quality of the of the positions and averages measurement errors out.

In FIG. 6 step 242 of rotating the rotatable structure comprises a step 644 of rotating the rotatable structure in a predetermined direction of rotation and at a predetermined angle of rotation. The predetermined angle of rotation can be any angle within the total angular rotation that the rotatable structure can do in relation to the support structure. In FIG. 6 the predetermined angle of rotation is obtained as 360 degrees divided by the number of obtained positions n. As a result the rotatable structure rotates 360/n degrees between every position where the position shall be obtained. As a consequence the obtained positions will be distributed equally at a circle around the axis of rotation. The angular orientation of the moving head light fixture in relation to the axis of rotation can as a consequence be obtained based on the plurality of obtained positions. The radius vector from each of the obtained positions can be linked to the angular orientation of the moving head light fixture in relation to the axis of rotation due to the fact that the position of each of the positions points can be linked to the predetermined position obtained in step 645. In FIG. 6 the position indicator is arranged in an equal number larger than 4 of positions (n>=4) and the corresponding positions has been obtained at each of these positions. Due to the fact that the rotatable structure is rotated 360/n degrees between every position and that the rotatable structure is arranged in an equal number of positions results in the fact that a number of n/2 position pairs can be obtained; where a position pairs comprises two obtained positions arranged at opposite sides of the circle/axis of rotation. The position pairs can be used to determine the pose of the moving head light fixture as described in connection with step 250 below.

In FIG. 6 step 250 comprises a step 654 of determining and verifying the distance between the two positions of each position pair. Since the positions of each position pair are arranged at opposite sides of the axis of rotation the distance between the positions of each positions pair should ideally be equal to the diameter of the circle which corresponds to 2r, where r is the distance from the axis of rotation to the position indicator. The position pair is verified by testing that the distance between the two points of the position is within a predefined tolerance. In case the distance between two points of a position pair is not within the predetermined tolerance the position pair can either be disregarded or the step 240 can be repeated in order to ensure prober data. Discarding position pairs without repeating step 240 requires that there are sufficient position pairs to perform the remaining steps of step 250.

Step 651 is a step of determining the position of the moving head light fixture and can for instance be determined based on at least three of the obtained position for instance by using Eq 8, Eq 9 and Eq 10.

In one or more embodiments the position of the moving head light fixture is obtained by obtaining an average position vector defined by the position vectors of the obtained positions, which is equally arranged along the circle around the axis of rotation.

$$\overrightarrow{P_{fix}} = \frac{1}{n}\sum_{i=1}^{n} \overrightarrow{P_n} \qquad \text{Eq 18}$$

where $\overrightarrow{P_{fix}}$ is the position vector of the moving head light fixture obtained as the average vector of the position vectors $\overrightarrow{P_n}$ of the obtained positions. The coordinates of the position vector of the moving head light fixture can be used to define the position of the moving head light fixture $p_{fix}$ [$x_{fix}$, $y_{fix}$, $z_{fix}$].

In one or more embodiments the position of the moving head light fixture can be determined by determining the midpoints between the positions of a position pair, as the midpoint between two positions at opposite side of the circle will lie at the center of the circle and can be used as the position of the moving head light fixture. Also the midpoints of all position pairs can be calculate and the average point of all the midpoints can be used as the position of the moving head light fixture. The coordinates of the midpoint or average of midpoints can be used to indicate the position of the moving head light fixture $p_{fix}$ [$x_{fix}$, $y_{fix}$, $z_{fix}$].

In step 653 at least one angular orientation vector $\overrightarrow{OA_{fix}}$ indicating the angular orientation of the moving head light fixture in relation to the axis of rotating is determine based on the obtained predetermined positions and defines the angular orientation of the support structure in relation to the axis of rotation. For instance an angular orientation vector can be defined as a vector formed between the positions of a position pair, as a radius vector from the position $p_{fix}$ [$x_{fix}$, $y_{fix}$, $z_{fix}$] of the moving head light fixture obtained in step 251 to one of the predetermined positions.

In step 652 at least one orientation vector $\overrightarrow{O_{fix}}$ indicating the orientation of the axis of rotation of the moving head light fixture is determine based on the obtained predetermined positions. The orientation may be defined as described previously as the cross product between two radius vectors or as the cross product between two secant vectors as describe previously. The secant vectors may for instance be defined between the two positions of the of a position pair.

Figure 7:
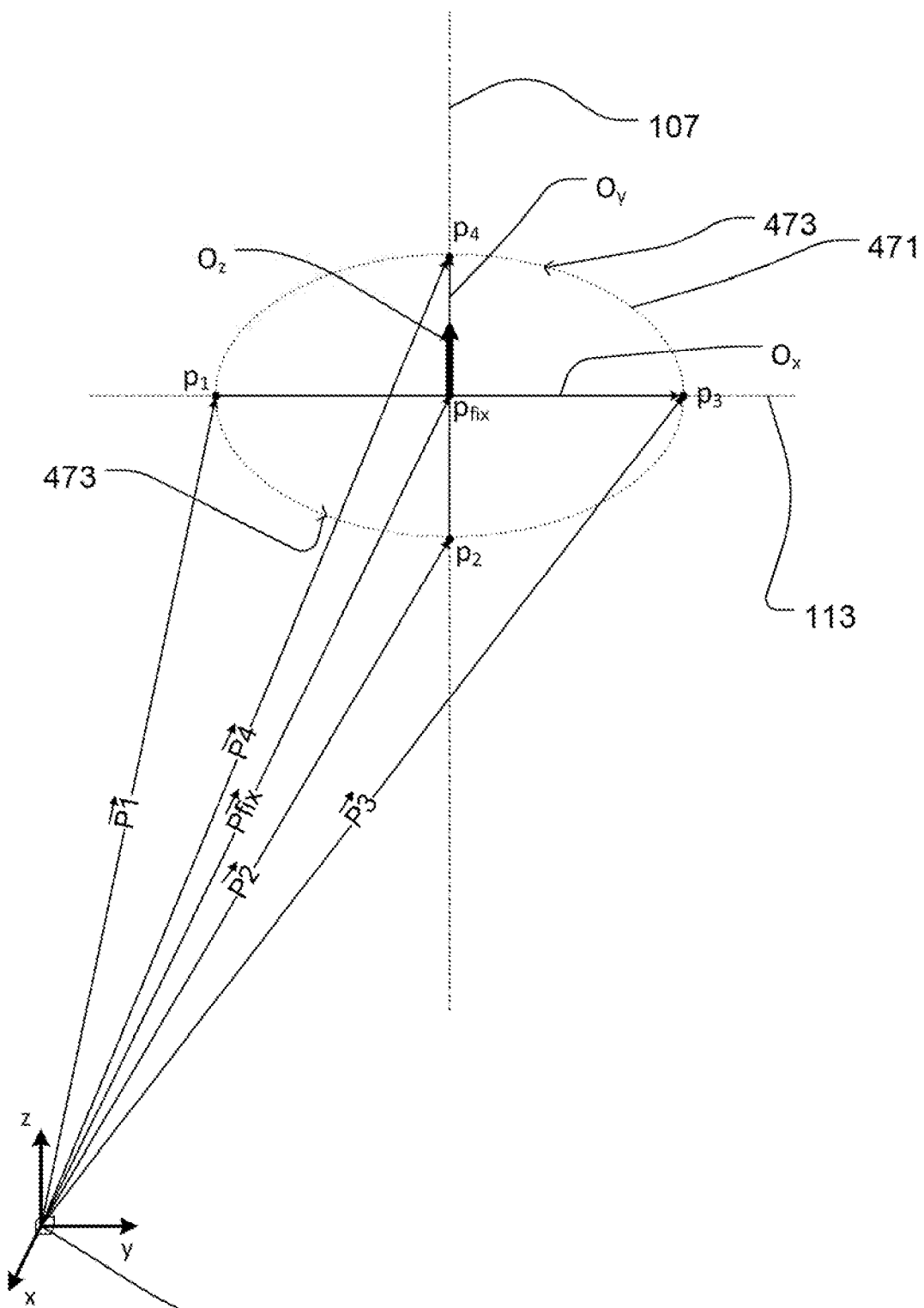
FIG. 7 illustrates a vector diagram illustrating the step of determining the pose based on the obtained positions according to the method of FIG. 6.

FIG. 7 illustrates a similar vector diagram as FIG. 4 and similar elements have been given the same reference numbers and will not be described further. The vector diagram of FIG. 7 serves to illustrate the method of obtaining the pose of a moving head light fixture as illustrated in FIG. 6. In this example the position indicator is arranged in 4 different positions $p_1$, $p_2$, $p_3$, and $p_4$. The first position $p_1$ is obtained by arranging the position indicator at a predetermined position (step 645). In this example the predetermined position corresponds to a zero degree rotation of the rotatable structure in relation to the support structure. As described in connection with FIG. 6 position $p_1$ is obtained (step 241) by measuring a plurality of positions using the position indicator (step 664), verifying the measured positions (step 647) and providing the position (step 648) as an average of the plurality of position measurements. Then the rotatable structure is rotated 360/4=90 degrees (step 644) and position $p_2$ is obtained in a similar manner as $p_1$. Position $p_2$ is thus obtained at a position where the rotatable structure has been rotated 90 degrees in relation to the support structure. Then the rotatable structure is rotated further 90 degrees (step 644) and position $p_3$ is obtained in a similar manner as $p_1$. Position $p_3$ is thus obtained at a position where the rotatable structure has been rotated 180 degrees in relation to the support structure. Finally the rotatable structure is rotated further 90 degrees (step 644) and position $p_4$ is obtained in a similar manner as $p_1$. Position $p_4$ is thus obtained at a position where the rotatable structure has been rotated 270 degrees in relation to the support structure. The obtained position is stored in a memory and used in step 250 of obtaining the pose of the moving head light fixture.

Positions $p_1$ and $p_3$ form a first position pair as they are arranged at opposite sides of the circle 471 and positions $p_2$ and $p_4$ form a second position pair as they are arranged at opposite sides of the circle 471. The position of the moving head light fixture $p_{fix}$ [$x_{fix}$, $y_{fix}$, $z_{fix}$] is found as the average point of all the midpoints of the first and second position pair.

The first midpoint can be found as:

$$\vec{M1} = \frac{1}{2}(\vec{P1} + \vec{P3}) = \frac{1}{2}\begin{pmatrix} x_1 + x_3 \\ y_1 + y_3 \\ z_1 + z_3 \end{pmatrix} \qquad \text{Eq 19}$$

where $\vec{M1}$ is a vector from the reference point 127 to the first midpoint, $\vec{P1}$ is a first position vector from the reference point 127 to the first point $p_1$ and $\vec{P3}$ is a third vector from the reference point 127 to the third point $p_3$.

The second midpoint can be found as:

$$\vec{M2} = \frac{1}{2}(\vec{P2} + \vec{P4}) = \frac{1}{2}\begin{pmatrix} x_2 + x_4 \\ y_2 + y_4 \\ z_2 + z_4 \end{pmatrix} \qquad \text{Eq 20}$$

where $\vec{M2}$ is a vector from the reference point 127 to the second midpoint, $\vec{P2}$ is a second position vector from the reference point 127 to the second point $p_2$ and $\vec{P4}$ is a fourth position vector from the reference point 127 to the fourth point $p_4$.

The position of the moving head light fixture can then be found as:

$$\vec{P_{fix}} = \frac{1}{2}(\vec{M1} + \vec{M2}) = \qquad \text{Eq 21}$$

$$\frac{1}{2}\left(\frac{1}{2}\begin{pmatrix} x_1 + x_3 \\ y_1 + y_3 \\ z_1 + z_3 \end{pmatrix} + \frac{1}{2}\begin{pmatrix} x_2 + x_4 \\ y_2 + y_4 \\ z_2 + z_4 \end{pmatrix}\right) = \frac{1}{4}\begin{pmatrix} x_1 + x_2 + x_3 + x_4 \\ y_1 + y_2 + y_3 + y_4 \\ z_1 + z_2 + z_3 + z_4 \end{pmatrix}$$

In this example the angular orientation and the orientation of the moving head light fixture is determined as a set of x', y' z' orientation vectors, where the orientation vectors are perpendicular to each other. The x', y' orientation vectors are angular orientation vectors determined in step 653 and the z' orientation vector corresponds the orientation vector determined in step 652.

The x' orientation vector $\vec{O_x}$ indicates the angular orientation of the moving head light fixture along an axis where the rotational structure have been arranged at a rotation of 0 degrees in relation to the support structure. The x' orientation vector $\vec{O_x}$, can be found as the secant vector from the first position point $p_1$ to the third position point $p_3$:

$$\vec{O_x} = \vec{P1} - \vec{P3} = \begin{pmatrix} x_1 - x_3 \\ y_1 - y_3 \\ z_1 - z_3 \end{pmatrix} \qquad \text{Eq 22}$$

The y' orientation vector $\vec{O_y}$ indicates the angular orientation of the moving head light fixture along an axis where the rotational structure have been arranged at a rotation of 90 degrees in relation to the support structure. The y' orientation vector $\vec{O_y}$ can be found as the secant vector from the second position point $p_2$ to the fourth position point $p_4$:

$$\vec{O_y} = \vec{P2} - \vec{P4} = \begin{pmatrix} x_2 - x_4 \\ y_2 - y_4 \\ z_2 - z_4 \end{pmatrix} \qquad \text{Eq 23}$$

The x' and y' orientation vectors is found in step 653 of the method illustrated in FIG. 6.

The z' orientation vector indicates the orientation of the moving head light fixture and is perpendicular to the plane formed by the x' and y' orientation vectors and can thus be found as the cross product between the x' and y' orientation vectors:

$$\vec{O_z} = \vec{O_x} \times \vec{O_y} \qquad \text{Eq 24}$$

The order of which the x' and y' orientation vectors are crossed is determined by the direction of rotation. The z' orientation vector will point downwards in relation to the support structure if the rotatable structure is rotated in the counter clockwise direction in relation to the support structure and z' orientation vector will point upwards in relation to the support structure if the rotatable structure is rotated in the clockwise direction in relation to the support structure.

In this example the pose of the moving head light fixture is thus indicated by:
- the position of the moving head light fixture at the position where the yoke rotation axis and head rotation axis intersects;
- a x' orientation vector indicating the orientation of the head rotation axis when the rotatable structure (the yoke) is rotated zero degrees in relation to the support structure (the base);
- a y' orientation vector indicating the orientation of the head rotation axis when the rotatable structure (the yoke) is rotated 90 degrees in relation to the support structure (the base); and
- a z' orientation vector indicating the orientation of the yoke rotation axis in a direction away from the support structure.

Figure 8:
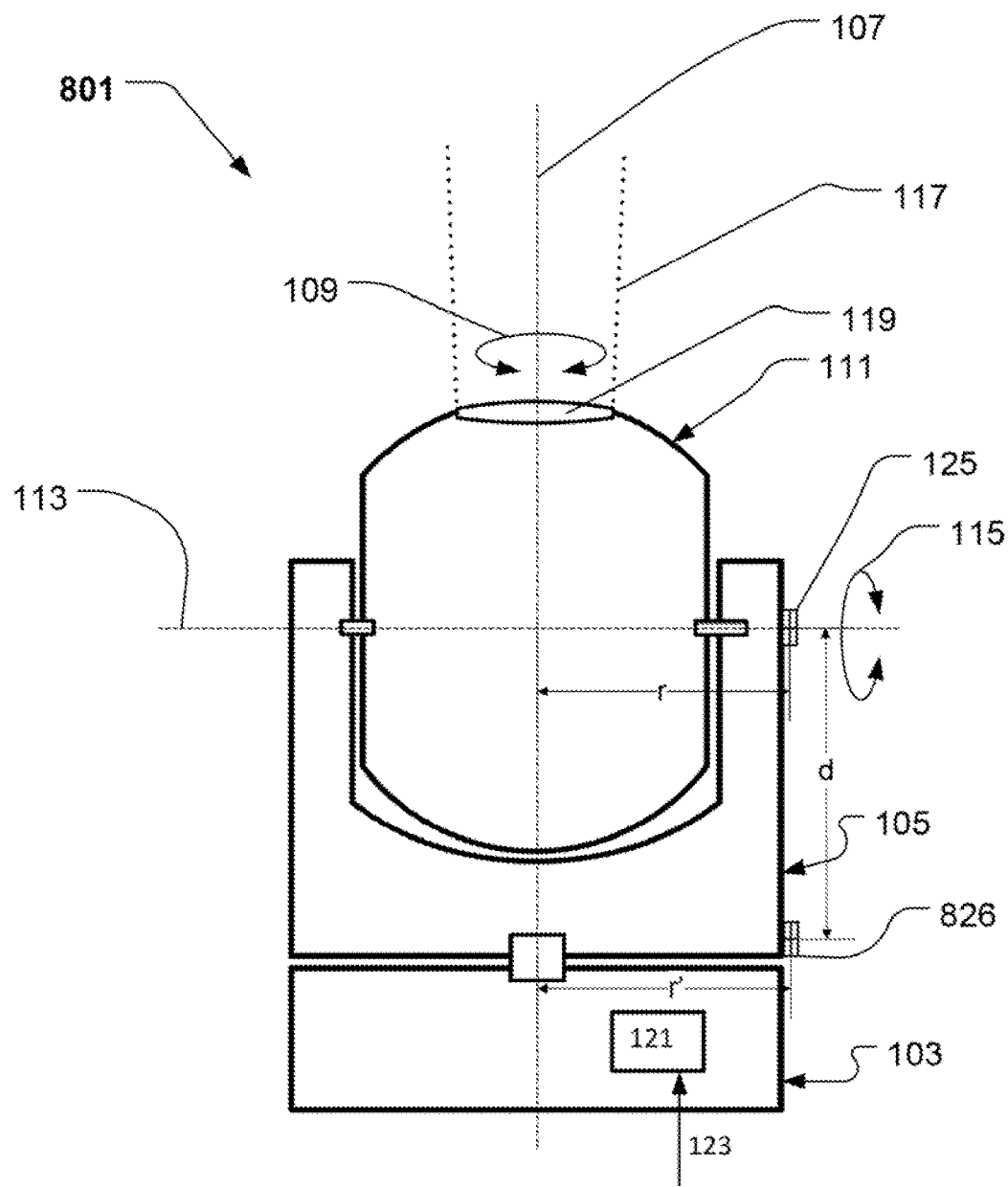
FIG. 8 illustrates a structural diagram of a moving head light fixture comprising two position indicators.
Figure 8:
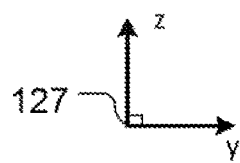

FIG. 8 illustrates a structural diagram of a light fixture 801 according to one aspect of the inventive subject matter. The light fixture 801 are substantially identical to the light fixture illustrated in FIG. 1 and identical features have been given the same reference numbers and will not be described in further detail. In FIG. 8 the light fixture comprises a second position indicator 826 arranged at the rotatable structure and at a second position along and offset the axis of rotation. The second position indicator indicates the position of the second position indicator in relation to a reference point 127. The second position indicator can be any device cable of indicating the position of the position indicator in relation to the reference point. The position indicator may for instance be based on a global navigation satellite system (GNSS) such as GPS, GLONASS, Galileo, BeiDou etc.; a Wi-Fi positioning system (WPS), bluetooth based positioning systems; radio frequency based position systems, sound/ultrasound position systems, light based positioning systems, accelerometer based positioning systems, gyro meter based positioning systems or combinations thereof. The second position indicator can for instance indicate the coordinates of its position in relation to the reference point 127, for instance in a 3D coordinate system formed by x, y, z axis.

Figure 9:
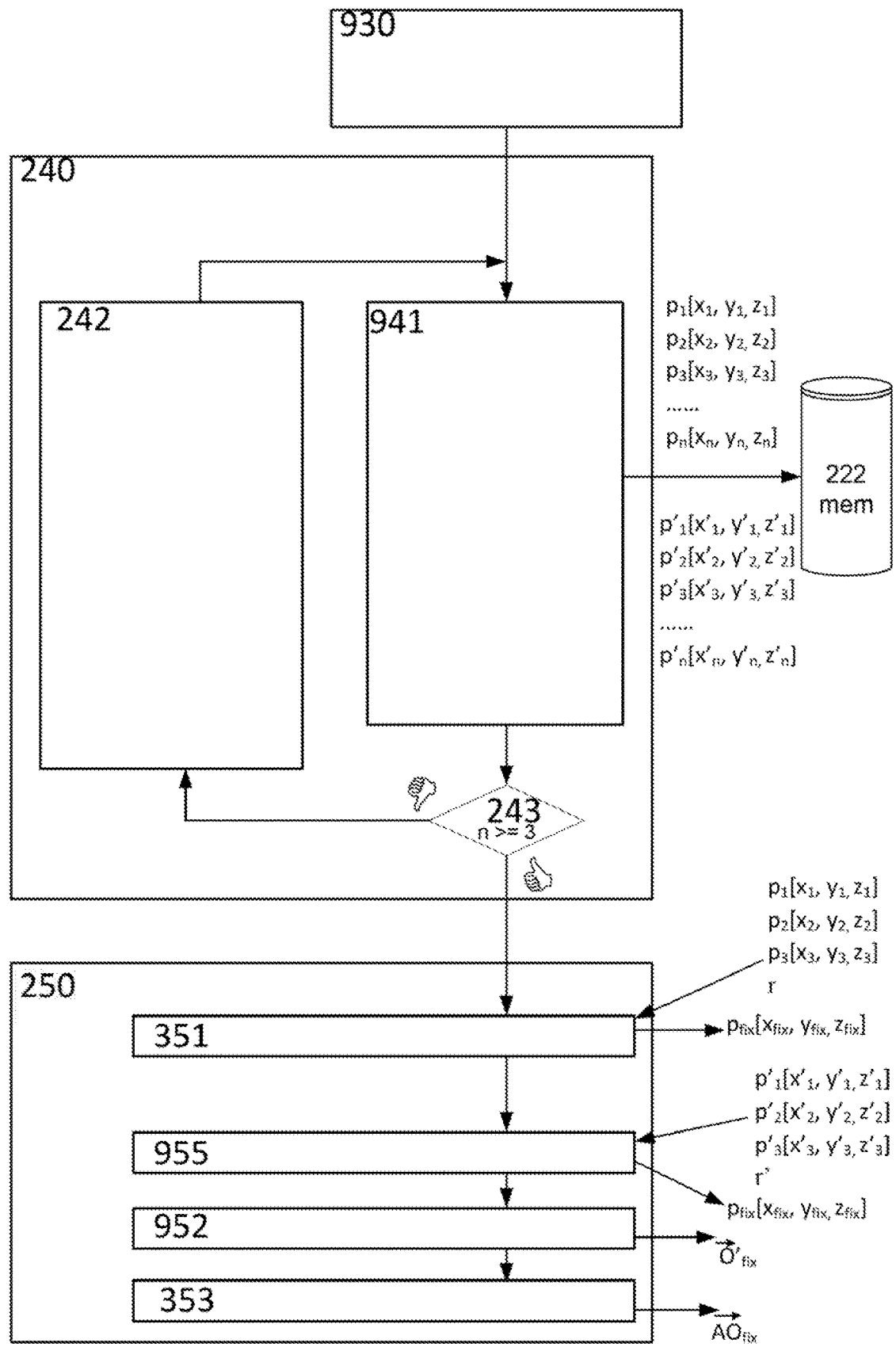
FIG. 9 illustrates a flow diagram of a method of determining the pose of a moving head light fixture comprising two position indicators.

FIG. 9 illustrate a flow diagram of one or more embodiments of the method of determining the pose of a moving head light fixture, where the moving head light fixture comprises a support structure and a rotatable structure rotatable connected to the support structure, such that the rotatable structure is rotatable around an axis of rotation. The rotatable structure comprises at least one light source generating a light beam. The method is described as a method for determine the pose of the moving head light fixture 801 illustrated in FIG. 8. The method comprises the same steps as the method illustrated in FIG. 2 and similar method steps have been given the same reference numbers and will not be described in further detail.

In FIG. 9 step 930 of providing a first position indicator at the rotatable structure and at a first position along and offset the axis of rotation comprises also a step of providing a second position indicator at the rotatable structure and at a second position. This step can be performed by arranging the position indicators at the rotatable structure at a position where they are arranged a distance from the axis of rotation. The position indicators can be arranged at any position at the rotatable structure which is offset the axis of rotation resulting in the fact that the position indicator will rotate around the axis of rotation upon rotation of the rotatable structure. The position indicators can for instance be provided as an integral part of the rotatable structure, provided inside the rotatable structure, provided at the outer surface of the rotatable structure or at any other position of the rotatable structure. The first and second position indicators are further arranged at different positions along the axis of rotation. At the moving head light fixture illustrated in FIG. 8 the first position indicator 125 is provided at the rotatable structure by arranging the position indicator 125 at the yoke 105 at a position offset the yoke axis 107. In FIG. 8 the first position indicator is arranged a distance r from the axis of rotation and will rotate around the yoke axis upon rotation of the yoke. Similar the second position indicator 826 is provided at the rotatable structure by arranging the position indicator 826 at the yoke 105 at a position offset the yoke axis 107. The second position indicator is arranged a distance r' from the axis of rotation and will rotate around the yoke axis upon rotation of the yoke. It is to be understood that the distances r and r' may be the same or different. The first and second position indicators are further arranged at different positions along the axis of rotation and separated by distance d.

Step 240 of arranging the position indicators at at least three different positions around the axis of rotation axis and obtaining the position of the position indicators at each of the at least three different positions can be performed by repeating the step 941 and 242 until the position of the position indicators have been obtained at at least three different positions around the axis of rotation.

Step 941 of obtaining the position the positions indicator 125 and 826 can be performed by using the position indicators to indicate their positions in relation to the reference point 127 and storing the indicated positions in a memory 222. The positions of the position indicators can be stored as any data sat capable of indicating the positions of the position indicators. For instance as x,y,z coordinates in relation to the reference point. Thereafter it is tested 243 if the positions have been obtained at at least three different positions and if not the case then the rotatable structure is rotated in step 242.

The obtained positions $p_1, p_2, p_3 \ldots p_n$ of the first position indicator may for instance be stored as a number of coordinates $p_1[x_1, y_1, z_1], p_2[x_2, y_2, z_2], p_3[x_3, y_3, z_3], \ldots p_n[x_n, y_n, z_n]$, where $x_n$ indicates the x coordinate, $y_n$ indicates the y coordinate and $z_n$ indicates the z coordinator of the position. Similar the obtained positions $p'_1, p'_2, p'_3 \ldots p'_n$ of the second position indicator may for instance be stored as a number of coordinates $p'_1[x'_1, y'_1, z'_1], p'_2[x'_2, y'_2, z'_2], p'_3[x'_3, y'_3, z'_3] \ldots p'_n[x'_n, y'_n, z'_n]$, where $x'_n$ indicates the x coordinate, $y'_n$ indicates the y coordinate and $z'_n$ indicates the z coordinator of the position.

Figure 10:
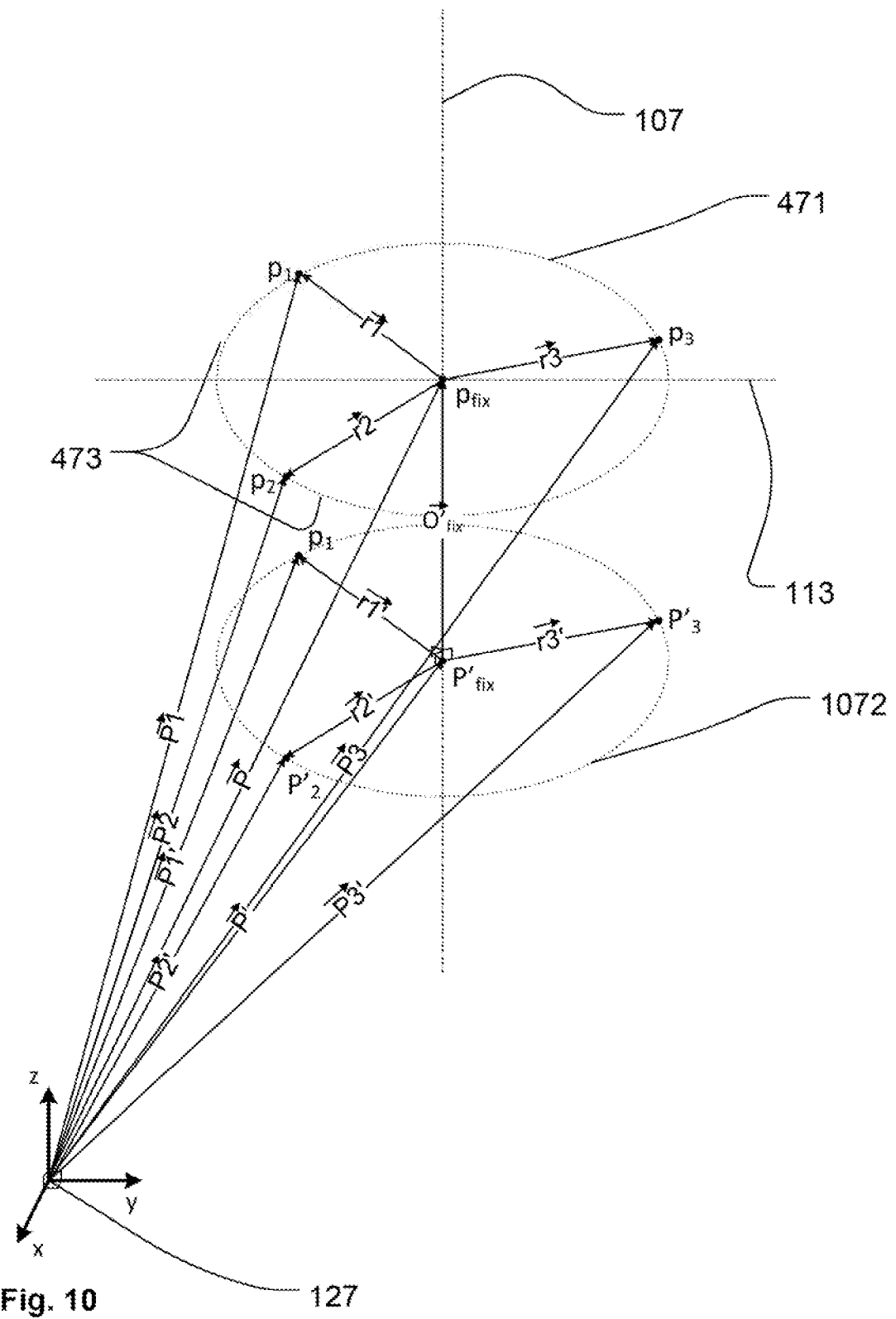
FIG. 10 illustrates a vector diagram illustrating the step of determining the pose based on the obtained positions according to the method of FIG. 9.

FIG. 10 illustrates a similar vector diagram as FIG. 4 and similar elements have been given the same reference numbers and will not be described further. The vector diagram of FIG. 10 serves to illustrate the method (FIG. 9) of obtaining the pose of a moving head light fixture as illustrated in FIG. 8. The positions obtained in step 240 and the corresponding position vectors are illustrated in the vector diagram. The positions $p_1, p_2, p_3 \ldots p_N$ obtained by the first position indicator will be positioned in a first circle 471 and the positions $p'_1, p'_2, p'_3 \ldots p'_n$ obtained by the second position indicator will be positioned on a second circle 1072.

In FIG. 10 step 250 of determining the pose of the moving head light fixture further comprises a step 351 of obtaining the position $p_{fix}[x_{fix}, y_{fix}, z_{fix}]$ of the light fixture based on the obtained positions of the first position indicator and Eq 8 to Eq 10 as described previously.

In FIG. 10 step 250 of determining the pose of the moving head light fixture further comprises a step 955 of obtaining the center $p'_{fix}[x'_{fix}, y'_{fix}, z'_{fix}]$ of the second circle 1072 formed by the obtained positions of the second position indicator. The second position indicator will like the first position indicator perform a circular rotation 1072 around the yoke axis and the obtained positions of the second position indicator $p'_1, p'_2$ and $p'_3$ will thus be positioned on this circle. The center of the circle $P'_{fix}$ can be found using the obtained positions $p'_1, p'_2, p'_3$ and the distance from the axis of rotation the second position indicator r' in Eq 8 to Eq 10 as a result the center of the second circle $p'_{fix}[x'_{fix}, y'_{fix}, z'_{fix}]$ can be found.

In FIG. 10 and in step 952 the orientation of the moving head light fixture $\vec{O}'_{fix}$ is obtained based on the position $p_{fix}[x_{fix}, y_{fix}, z_{fix}]$ of the moving head light fixture and the center of the second circle $p'_{fix}[x'_{fix}, y'_{fix}, z'_{fix}]$:

$$\vec{O'_{fix}} = \vec{P'_{fix}} - \vec{P_{fix}} = \begin{pmatrix} x'_{fix} - x_{fix} \\ y'_{fix} - y_{fix} \\ z'_{fix} - z_{fix} \end{pmatrix} \qquad \text{Eq 25}$$

where $\vec{P_{fix}}$ is the position vector of position $p_{fix}$ and $\vec{P'_{fix}}$ is the position vector of position $p'_{fix}$.

Using two position indicators makes it possible to obtain the orientation vector without knowing the direction of rotation.

The angular orientation of the moving head light fixture can be determined in step 353 as described previously.

Figure 11:
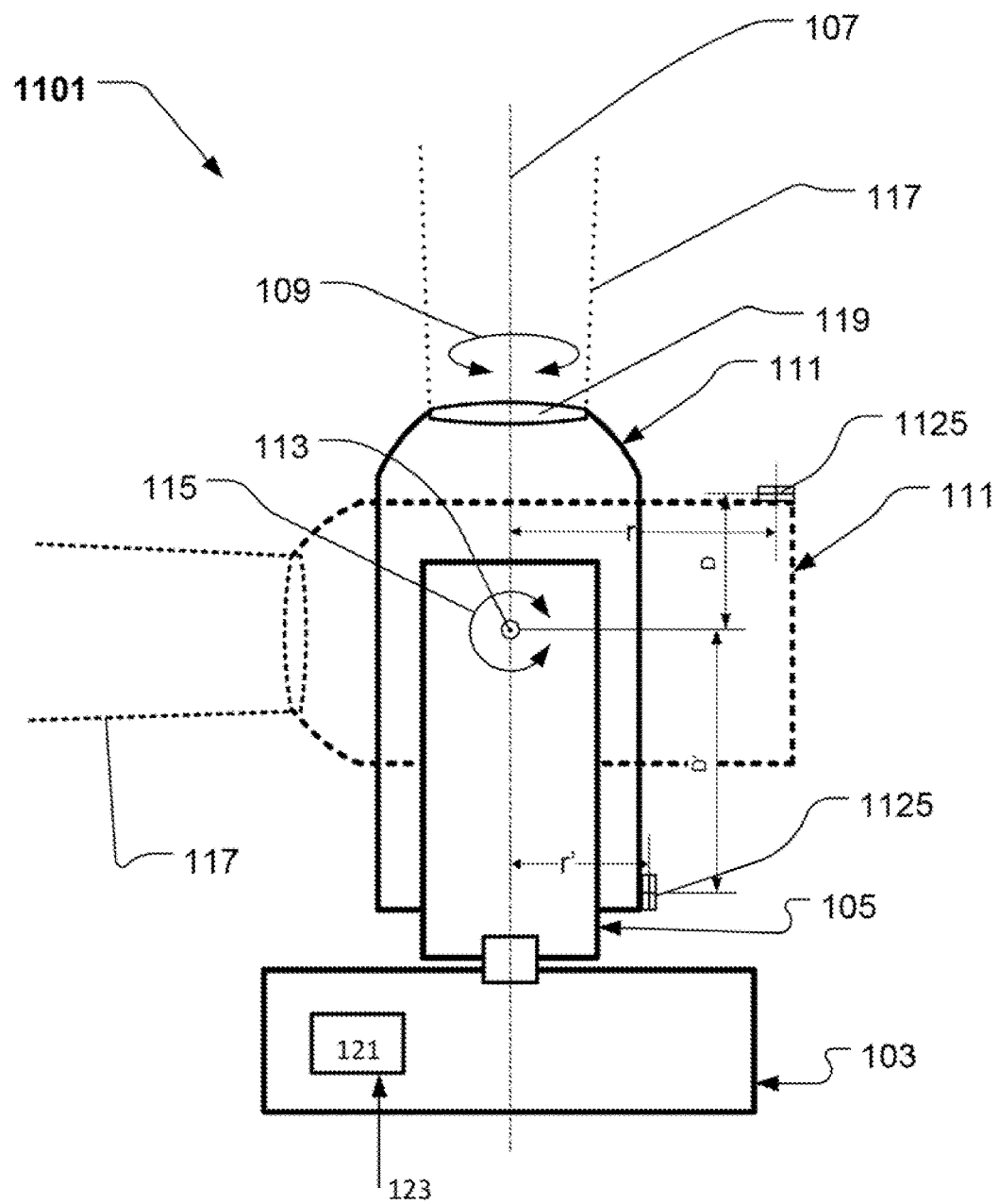
FIG. 11 illustrates a structural diagram of a moving head light fixture comprising a position indicator arranged at the head.
Figure 11:
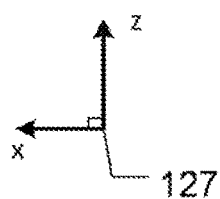

FIG. 11 illustrates a structural diagram of a light fixture 1101 the according to one aspect of the inventive subject matter. The light fixture 1101 is substantially identical to the light fixture illustrated in FIG. 1 and identical features have been given the same reference numbers and will not be described in further detail. In this drawing the light fixture 110 is illustrated from the side and the head axis 113 is thus perpendicular to the plane of the drawing. As previously described the head is rotatable around the head axis 113 as indicated by arrow 115 and the head 111 is in dotted lines illustrated in a first position where the head is rotated 90 degrees in relation to the yoke axis and the light beam 117 is in this position substantially parallel with the base. In solid lines the head 111 is illustrated in as second position where the head is rotated 0 degrees in relation to the yoke axis and the light beam 117 is substantially directed upwards in relation to the base.

In FIG. 11 the light fixture comprises a first position indicator 1125 arranged at the head 111 and the position indicator indicates the position of the first position indicator in relation to a reference point 127 as described previously. The position indicator 1125 will thus move in relation to the yoke axis upon rotation of the head and in the first position of the head be arranged at a distance r from the yoke axis and distance D along the head axis. In the second position of the head the first position indicator 1125 is arrange a distance r' from the yoke axis and distance D' along the head axis.

Figure 12:
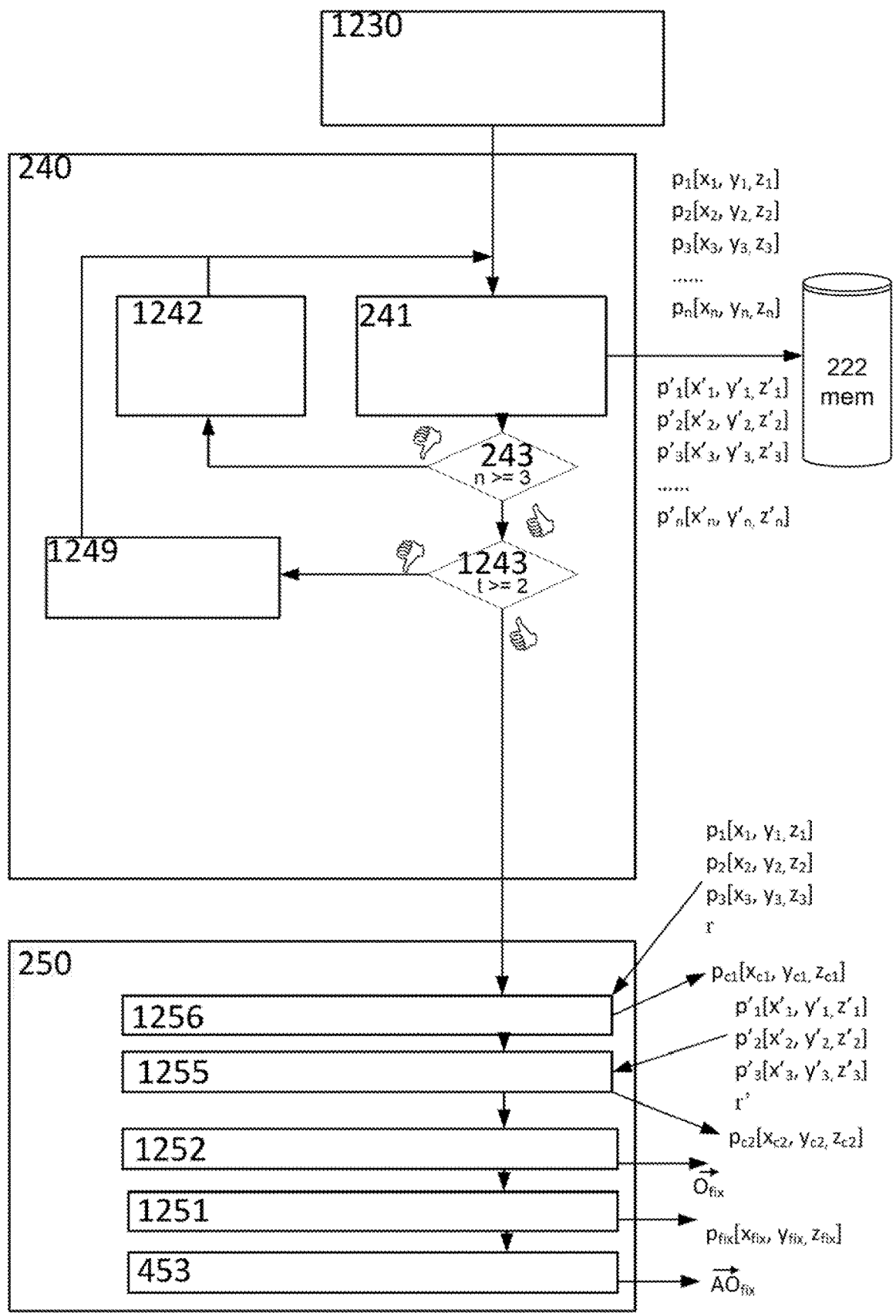
FIG. 12 illustrates a flow diagram of a method of determining the pose of a moving head light fixture comprising a position indicator arranged at the head.

FIG. 12 illustrate a flow diagram of one or more embodiments of the method of determining the pose of the moving head light fixture illustrated in FIG. 11. The method comprises substantial identical steps as described in connection with the previous described method steps In FIG. 12 step 1230 of providing a first position indicator at the rotatable structure and at a first position along and offset the axis of rotation is performed by arranging the first position indicator at the head of a moving head light fixture where the head is rotatable in relation to a yoke, which is rotatable in relation to a base. The position indicators can be arranged at any position at the head which is offset the yoke axis resulting in the fact that the position indicator will rotate around the yoke axis upon rotation of the yoke. The position indicators can for instance be provided as an integral part of the head, provided inside the head, provided at the outer surface of the head or at any other position of the head.

Step 240 of arranging the position indicators at at least three different positions around the axis of rotation axis and obtaining the position of the position indicators at each of the at least three different positions can be performed by repeating the steps 241 and 242 until the position of the position indicators have been obtained at at least three different positions around the axis of rotation.

In FIG. 12 the repetition of steps 241 and 242 is performed with the head at at least two different positions in relation to the yoke axis. In FIG. 12 this is performed in step 1243 verifying that at at least three positions have been obtained with the head at at least two different position in relation to the yoke axis. This can for instance be done by increasing a counter t by 1 every time test 243 is OK and then in 1243 test if the counter t is at least 2. If test 1243 is negative then a step 1249 of rotating the head in relation to the head axis is performed, whereby the head is arranged at a different position in relation to the yoke axis. Steps 241 and 242 are then repeated until at least three positions of the position indicators around the yoke axis are obtained. It is noted that the at least three positions of the position indicator around the yoke axis can be performed at more than two positions of the head in relation to the yoke.

The obtained positions $p_1, p_2, p_3 \ldots p_n$ of the first position indicator with the head at the first position may be stored as a number of coordinates $p_1[x_1, y_1, z_1], p_2[x_2, y_2, z_2], p_3[x_3, y_3, z_3], \ldots p_n[x_n, y_n, z_n]$, where $x'_n$ indicates the x coordinate, $y_n$ Indicates the y coordinate and $z_n$ indicates the z coordinator of the position. Similarly, the obtained positions $p'_1, p'_2, p'_3 \ldots p'_n$ of the first position indicator with the head at the second position may for instance be stored as a number of coordinates $p'_1[x'_1, y'_1, z'_1], p'_2[x'_2, y'_2, z'_2], p'_3[x'_3, y'_3, z'_3], \ldots p'_n[x'_n, y'_n, z'_n]$, where $x'_n$ indicates the x coordinate, $y'_n$ indicates the y coordinate and $z'_n$ indicates the z coordinator of the position.

Figure 13:
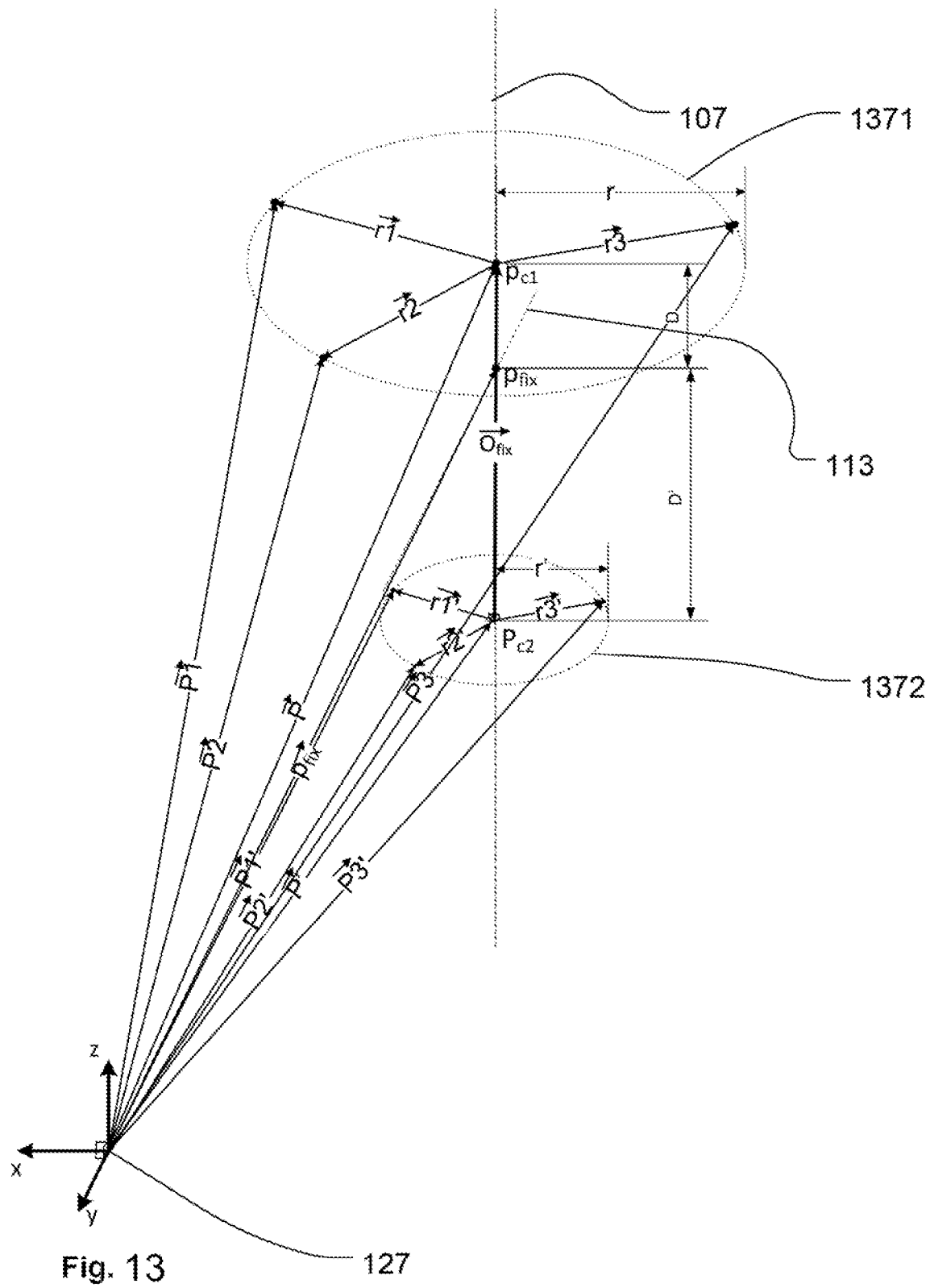
FIG. 13 illustrates a vector diagram illustrating the step of determining the pose based on the obtained positions according to the method of FIG. 12.

FIG. 13 illustrates a similar vector diagram as FIG. 10 and similar elements have been given the same reference numbers and will not be described further. The vector diagram of FIG. 12 serves to illustrate the method (FIG. 12) of obtaining the pose of a moving head light fixture (FIG. 11). The positions obtained in step 240 and the corresponding position vectors are illustrated in the vector diagram. The positions $p_1, p_2, p_3, \ldots p_n$ obtained by the first position with the head at the first position will be positioned in a first circle 1371 and the positions $p'_1, p'_2, p'_3 \ldots p'_n$ obtained by the second position indicator will be positioned on a second circle 1372.

In FIG. 12 the step 250 of determining the pose of the moving head light fixture further comprises a step 1256 of obtaining the center $p_{c1}[x_{c1}, y_{c1}, z_{c1}]$ of the first circle 1371 formed by the obtained positions of the position indicator with the head at the first position. The center of the circle $p_{e1}$ can be found using the obtained positions $p_1, p_2, p_3 \ldots p_n$ and the distance from the axis of rotation the second position indicator r using Eq 8 to Eq 10 as a result the center of the second circle $p_{c1}[x_{c1}, y_{c1}, z_{c1}]$ can be found. Alternatively Eq 18 can also be used to find the center of the first circle.

In this FIG. 12 the step 250 of determining the pose of the moving head light fixture further comprises a step 1255 of obtaining the center $p_{c2}[x_{c2}, y_{c2}, z_{c2}]$ of the second circle 1372 formed by the obtained positions of the position indicator with the head at the second position. The center of the circle $P_{c2}$ can be found using the obtained positions $p'_1, p'_2, p'_3 \ldots p'_n$ and the distance from the axis of rotation the second position indicator using Eq 8 to Eq 10 as a result the center of the second circle $p_{c2}[x_{c2}, y_{c2}, z_{c2}]$ can be found. Alternatively Eq 18 can also be used to find the center of the second circle.

In FIG. 12 and in step 1252 the orientation of the moving head light fixture $\vec{O}_{fix}$ is obtained based on the center of the first and second circles using:

$$\vec{O}_{fix} = \vec{P}_{c1} - \vec{P}_{c2} = \begin{pmatrix} x_{c1} - x_{c2} \\ y_{c1} - y_{c2} \\ z_{c1} - z_{c2} \end{pmatrix} \qquad \text{Eq 26}$$

where $\vec{P}_{c1}$, is the position vector of position $p_{c1}$ and $\vec{P}_{c2}$ is the position vector of position $p_{c2}$.

In FIG. 12 and in step 1251 the position of the moving head light fixture, $p_{fix}[x_{fix}, y_{fix}, z_{fix}]$ is obtained based on the center of the first and second circles and the orientation vector obtained in step 1252. In FIG. 13 the position of the moving head light fixture is defined at the intersection of the yoke axis 107 and the head axis 113. The position vector $\vec{P}_{fix}$ can be found as:

$$\vec{P}_{fix} = \vec{P}_{c2} + D' \frac{1}{|\vec{O}_{fix}|} \vec{O}_{fix} \qquad \text{Eq 27}$$

where $\vec{P}_{c2}$ is the position vector of position $p_{c2}$, D' the distance along the yoke axis from the head axis to the position indicator when the head is arranged in the second position and $1/|\vec{O_{fix}}|\,\vec{O_{fix}}$ is the unit-vector of the orientation vector.

Alternatively the position vector $\vec{P_{fix}}$ can be found as:

$$\vec{P_{fix}} = \vec{P_{c1}} - D\frac{1}{|\vec{O_{fix}}|}\vec{O_{fix}} \qquad \text{Eq 28}$$

where $\vec{P_{c1}}$ is the position vector of position $p_{c12}$, D the distance along the yoke axis from the head axis to the position indicator when the head is arranged in the first position and $$\frac{1}{|\vec{O_{fix}}|}\vec{O_{fix}}$$

is the unit-vector of the orientation vector.

The angular orientation of the moving head light fixture can be determined in step 453 as described previously where one of the obtained positions is to be considered as a predetermined position.

It is to be understood that the methods of determining the pose of a moving head light fixture described previously can be combined and that some method steps of one of the described methods may be used in other of the described methods.

The method can be embodied into various systems for instance the methods may be implemented directly into the processor of a moving head light fixture in such system the position indicators shall be able to determine their position internally and provide the positions to the processor of the moving head light fixture. In such system the moving head light fixture can be configured to send the pose of the moving head light fixture directly to a central controller such as a light controller, light controller software or a visualization software.

It is also possible to embody the method into a system where a central controller sends control commands to the moving head light fixture and thereby ensure the moving head light fixture performs the rotations/movements as described in the methods. The positions of the position indicator can then be determined by a position determine system which determines the positions of the positions indicator at the various positions and sends these position to the central controller. The central controller is then configured to determining the pose of the moving head light fixture based on the received data. Thus the various calculations can be done in the light fixture, in a central controller or in positioning system.

It is noticed the position indicator can be based on ultrasound technology, Radio frequency based or light based technology. The position indicator may for instance be provided as a transmitter sending out a reference signal in sound, ultrasound, radio frequency or light. A number of receivers can then be provided at the surroundings of the position indicator and these receivers receives the reference signal from the transmitter and a controller can be configured to determine the position of the position indicator based on the signals received by the receivers. For instance based on the time delay that the different receivers receive the reference signals, based on the level of the reference signal etc.

In one or more embodiments the positioning system is based on ultrasound, the position indicator sends ultrasound which then is received by a number of receivers which based on delay of the ultra sound determines the position of the moving head light fixture. Opposite system where a number of transmitters is arrange around the light fixture and which sends ultrasound where position indicator determines it position based on delay between different ultrasound send by the transmitters is also possible. For instance as disclosed in WO 95/14241, U.S. Pat. Nos. 6,141,293, 6,316,934, 6,484,131, 6,487,516, wo06102844, WO08005931 or WO11054358. Similar system can be set up using RF transmitters and receivers.

The invention claimed is:

1. A method of determining a position and orientation of a moving head light fixture in a 3D space, wherein the moving head light fixture comprises a support structure and a rotatable structure, the rotatable structure is rotatably connected to the support structure and is rotatable around an axis of rotation and the rotatable structure comprises at least one light source generating a light beam, the rotatable structure comprises a first position indicator at the rotatable structure, the first position indicator is arranged at a first position offset the axis of rotation, the first position indicator indicates the position of the first position indicator in relation to a reference point;
   the method comprising the steps of:
      arranging the first position indicator to at least three different positions around the axis of rotation;
      obtaining a position of the first position indicator at each of the at least three different positions, where the positions of the first position indicator are obtained using the first position indicator and where the first position indicator is arranged in relation to the reference point to the at least three different positions by rotating the rotatable structure around the axis of rotation; and
      determining the position and orientation of the moving head light fixture in the 3D space based on the obtained positions of the first position indicator at each of the at least three different positions.

2. The method as claimed in claim 1, wherein the step of determining the position and orientation of the moving head light fixture in the 3D space further comprises:
      determining an orientation vector, where the orientation vector indicates the orientation of the rotation axis in relation to a reference point; and
      determining the position of the moving head light fixture in relation to the reference point.

3. The method as claimed in claim 1, wherein the step of determining the position and orientation of the moving head light fixture in the 3D space further comprises determining an angular orientation vector, where the angular orientation vector indicates the angular orientation of the moving head light fixture in relation to the axis of rotation.

4. The method as claimed in claim 1, wherein the step of obtaining the position of the first position indicator at the at least three different positions further comprises rotating the rotatable structure in a predetermined direction of rotation and the step of determining the position and orientation of the moving head light fixture in the 3D space is further based on the direction of rotation.

5. The method as claimed in claim 1, wherein the step of arranging the first position indicator to at least three different positions around the axis of rotation further comprises arranging the first position indicator to at least one predetermined position, and the step of determining the position and orientation of the moving head light fixture in the 3D space is further based on the at least one predetermined position.

6. The method as claimed in claim 3, wherein the step of arranging the first position indicator to at least three different positions around the axis of rotation further comprises arranging the first position indicator to at least one predetermined position, and the step of determining the angular orientation vector is based on the at least one predetermined position.

7. The method as claimed in claim 1, wherein the step of determining the position and orientation of the moving head light fixture in the 3D space is based on a predetermined distance, where the predetermined distance indicates the distance from the axis of rotation to the first position indicator.

8. The method as claimed in claim 1, further comprising the steps of:
arranging the first position indicator a second position along the axis of rotation, where the second position is different from the first position along the axis of rotation,
and at the second position:
arranging the first position indicator to at least three different positions around the axis of rotation by rotating the rotatable structure around the axis of rotation; and
obtaining the position of the first position indicator at each of the at least three different positions using the position indicator; and
the step of determining the position and orientation of the moving head light fixture in the 3D space is further based on the obtained positions of the first position indicator at the second position.

9. The method as claimed in claim 1, wherein the moving head light fixture comprises a second position indicator at a second position offset the axis of rotation and at a second position along the axis of rotation, the second position along the axis of rotation is different from the first position along the axis of rotation, the second position indicator indicates the position of the second position indicator in relation to the reference point, the method further comprising the steps of:
arranging the second position indicator to at least three different positions around the axis of rotation by rotating the rotatable structure around the axis of rotation; and
obtaining the position of the second position indicator at each of the at least three different positions using the second position indicator;
when the step of determining the position and orientation of the moving head light fixture in the 3D space is further based on the obtained positions of the second position indicator.

10. The method as claimed in claim 9, wherein the step of obtaining the position of any one of the position indicators further comprises obtaining a plurality of position measurements at each of the different positions and the obtained positions of any one of the position indicators are obtained based on the plurality of position measurements.

11. The method as claimed in claim 10, wherein the step of obtaining the position of any one of the position indicators further comprises obtaining a statistical spread of the plurality of position measurements and discarding position measurements falling outside of a predetermined spread tolerance.

12. The method as claimed in claim 9, wherein the steps of arranging any one of the position indicators to at least three different positions around the axis further comprises arranging the position indicator at two positions opposite each other in relation to the axis of rotation by rotating the rotatable structure 180 degrees in relation to the axis of rotation.

13. The method as claimed in claim 12, further comprising a step of providing the first position indicator at the first position of the rotatable structure.

14. The method as claimed in claim 12 further comprising a step of providing the second position indicator at the second position of the rotatable structure.

15. A system for determining a position and orientation of a moving head light fixture in a 3D space, the system comprising:
at least one moving head light fixture having a support structure and a rotatable structure, the rotatable structure is rotatably connected to the support structure and is rotatable around an axis of rotation, the rotatable structure has at least one light source generating a light beam, the rotatable structure has a first position indicator indicating the position of the first position indicator in relation to a reference point and the first position indicator is arranged offset the axis of rotation; and
a controller configured to arrange the first position indicator to at least three different positions around the axis of rotation to obtain the position of the position indicator at each of the at least three different positions, where the positions of the first position indicator are obtained from the position indicator and the first position indicator is arranged in relation to the reference point to the at least three different positions by rotating the rotatable structure around the axis of rotation, the controller is further configured to determine a position and orientation of the moving head light fixture in the 3D space based on the obtained positions of the first position indicator at each of the at least three different positions.

16. The system according to claim 15, further comprising a predetermined distance indicating a distance from the axis of rotation to the first position indicator and the position and orientation of the moving head light fixture in the 3D space is determined further based on the predetermined distance.

17. The system as claimed in claim 15 wherein the controller further comprises a central light controller connected to the moving head light fixture, the central light controller is configured to send control signals to the moving head light fixture and the controller is configured to rotate the rotatable structure of the moving head light fixture by sending a control signal indicative of the rotation to the moving head light fixture and the central light controller is configured to receive the position of the position indicator from a position system comprising the position indicator.

18. The system as claimed in claim 15 wherein the controller is configured to arrange the first position indicator at a second position along the axis of rotation, the second position being different than the first position along the axis of rotation, and wherein the position and orientation of the moving head light fixture in the 3D space is determined further based on the obtained positions of the first position and the second position.

19. The system as claimed in claim 15, further comprising:
a second position indicator at a second position of the rotatable structure, the second position indicator indicating the position of the second position indicator in relation to a reference point;

the controller is configured to arrange the second position indicator to at least three different positions around the axis of rotation and obtain the position of the second position indicator at each of the at least three different positions; and the controller is configured to determine the position and orientation of the moving head light fixture in the 3D space based on the obtained positions of the first position indicator and the obtained positions of the second position indicator.

* * * * *